US009546586B2

(12) United States Patent
Noma et al.

(10) Patent No.: US 9,546,586 B2
(45) Date of Patent: *Jan. 17, 2017

(54) EXHAUST GAS PURIFICATION SYSTEM

(75) Inventors: Yasuo Noma, Osaka (JP); Taichi Togashi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/700,225

(22) PCT Filed: Apr. 28, 2011

(86) PCT No.: PCT/JP2011/060464
§ 371 (c)(1),
(2), (4) Date: Dec. 19, 2012

(87) PCT Pub. No.: WO2011/152165
PCT Pub. Date: Dec. 8, 2011

(65) Prior Publication Data
US 2013/0086890 A1 Apr. 11, 2013

(30) Foreign Application Priority Data

Jun. 2, 2010 (JP) ................................. 2010-126774

(51) Int. Cl.
*F01N 9/00* (2006.01)
*F02D 41/40* (2006.01)
(Continued)

(52) U.S. Cl.
CPC ............. *F01N 9/002* (2013.01); *F01N 3/0253* (2013.01); *F01N 11/00* (2013.01); *F02D 41/029* (2013.01);
(Continued)

(58) Field of Classification Search
CPC .... F01N 3/0335; F01N 11/00; F01N 2240/36; F01N 3/0253; F01N 9/002; F01N 3/035; F01N 3/2885; F02D 2250/11; F02D 41/405; F02D 2200/0812; F02D 41/021; F02D 41/22
(Continued)

(56) References Cited

U.S. PATENT DOCUMENTS

2003/0106308 A1* 6/2003 Gabe ..................... F01N 3/0222
60/295
2005/0178111 A1* 8/2005 Kammel ........................ 60/289
(Continued)

FOREIGN PATENT DOCUMENTS

JP 2000-145430 5/2000
JP 2003-027922 1/2003
(Continued)

*Primary Examiner* — Patrick Maines
*Assistant Examiner* — Brandon Lee
(74) *Attorney, Agent, or Firm* — Norris McLaughlin & Marcus, P.A.

(57) ABSTRACT

An exhaust gas purification system is provided with an exhaust gas purification device which is arranged in an exhaust gas route of a common rail type engine, and is structured such that a plurality of renewing modes which burn and remove a particulate matter deposited within the exhaust gas purification device is executed. One of the plurality of renewing modes is an initialization renewing (a forced renewing) mode which supplies a fuel into the exhaust gas purification device by a post injection regardless of a clogged state of the exhaust gas purification device, in the case that an accumulated drive time of the engine becomes equal to or more than a previously set time.

2 Claims, 17 Drawing Sheets

(51) Int. Cl.
- *F01N 11/00* (2006.01)
- *F01N 3/025* (2006.01)
- *F01N 3/033* (2006.01)
- *F01N 3/035* (2006.01)
- *F01N 3/28* (2006.01)
- *F02D 41/02* (2006.01)
- *F02D 41/22* (2006.01)

(52) U.S. Cl.
CPC ............ *F02D 41/405* (2013.01); *F01N 3/035* (2013.01); *F01N 3/0335* (2013.01); *F01N 3/2885* (2013.01); *F01N 2240/36* (2013.01); *F02D 41/021* (2013.01); *F02D 41/22* (2013.01); *F02D 2200/0812* (2013.01); *F02D 2250/11* (2013.01); *Y02T 10/42* (2013.01); *Y02T 10/44* (2013.01); *Y02T 10/47* (2013.01)

(58) Field of Classification Search
USPC ................................................... 60/295, 297
See application file for complete search history.

(56) References Cited

U.S. PATENT DOCUMENTS

| | | | | |
|---|---|---|---|---|
| 2005/0235634 | A1* | 10/2005 | Schulte et al. | 60/295 |
| 2007/0271906 | A1* | 11/2007 | Berke et al. | 60/285 |
| 2009/0183495 | A1 | 7/2009 | Onodera et al. | |
| 2010/0024395 | A1* | 2/2010 | Gotou et al. | 60/277 |
| 2010/0089032 | A1* | 4/2010 | Iwashita et al. | 60/274 |
| 2010/0122522 | A1* | 5/2010 | Tsukada et al. | 60/284 |

FOREIGN PATENT DOCUMENTS

| | | |
|---|---|---|
| JP | 2005-069148 | 3/2005 |
| JP | 2005-139944 | 6/2005 |
| JP | 2007-332801 | 12/2007 |
| JP | 2010-084686 | 4/2010 |

* cited by examiner (a) Self-renewing flag table FT1

| Flag code | Flag value |
|---|---|
| RGMOD | 0 |
| INTSLT | 0 |
| OUTSLT | 0 |
| APSTINJ | 1 |
| EMMOD | 0 |
| ESPTINJ | 1 |

(b) Automatic auxiliary renewing flag table FT2

| Flag code | Flag value |
|---|---|
| RGMOD | 1 |
| INTSLT | 1 |
| OUTSLT | 1 |
| APSTINJ | 1 |
| EMMOD | 0 |
| ESPTINJ | 1 |

(c) Manual auxiliary renewing flag table FT3

| Flag code | Flag value |
|---|---|
| RGMOD | 2 |
| INTSLT | 1 |
| OUTSLT | 1 |
| APSTINJ | 1 |
| EMMOD | 1 |
| ESPTINJ | 1 |

Remarks

0: Self-renewing mode
1: Automatic auxiliary renewing mode
2: Manual auxiliary renewing mode.

0: Without intake air throttle
1: With intake air throttle

0: Without exhaust gas throttle
1: With exhaust gas throttle

0: Without auxiliary renewing post injection
1: With auxiliary renewing post injection 0: Automatic emergency renewing mode
1: Manual emergency renewing mode 0: Without emergency renewing post injection
1: With emergency renewing post injection

Fig 18

EXHAUST GAS PURIFICATION SYSTEM

TECHNICAL FIELD

The present invention relates to an exhaust gas purification system with respect to an engine which is mounted to a working machine, for example, a construction machine, an agricultural machine and an engine generator.

BACKGROUND ART

In recent years, as an application of an emission control of a high order with regard to a diesel engine (hereinafter, refer simply to as an engine), it is going to be desired to mount an exhaust gas purification device which purifies an air pollutant in an exhaust gas, to a construction machine, an agricultural machine and an engine generator to which the engine is mounted. As the exhaust gas purification device, a diesel particulate filter (hereinafter, refer to as DPF) has been known (refer to Patent Documents 1 and 2). The DPF is provided for collecting a particulate matter (hereinafter, refer to as PM) or the like. In this case, if the PM which is collected by the DPF exceeds a prescribed amount, a distribution resistance within the DPF is increased and thereby causing a reduction of an engine output. Accordingly, it is also frequently carried out to remove the PM which is deposited in the DPF on the basis of a temperature rise of the exhaust gas so as to bring back a PM collecting capacity of the DPF (renew the DPF).

CITATION LIST

Patent Literature

Patent Document 1: Japanese Patent Application Laid-open No. 2000-145430
Patent Document 2: Japanese Patent Application Laid-open No. 2003-27922

SUMMARY OF INVENTION

Technical Problem

However, since it is necessary to enhance an exhaust gas temperature (apply a thermal energy to the exhaust gas) in the case the DPF is renewed in the conventional structure, a fuel consumption rate is increase to exceed an operating amount of an accelerator operating device such as a throttle lever and an accelerator pedal, thereby enlarging an engine output. Accordingly, since there are generated a shock and a change of an engine sound which are caused by a fluctuation of the engine torque, an uncomfortable feeling is applied to an operator. It is impossible to deny a possibility that the operator misidentifies the sudden shock and the change of the engine sound as an abnormality. Particularly, in a construction machine such as a hydraulic shovel which performs a careful work on the basis of the engine sound, the sudden shock and the change of the engine sound which are generated at a time of renewing the DPF are not preferable.

A first object of the present invention is to dissolve a problem that an uncomfortable feeling is given to an operator due to a shock or a change of an engine sound caused by a fluctuation of an engine torque.

Accordingly, it is a technical object of the present invention to provide an exhaust gas purification system to which an improvement is applied by making a study of the actual condition mentioned above.

Solution to Problem

According to a first aspect of the invention, there is provided an exhaust gas purification system, the exhaust gas purification system including an exhaust gas purification device which is arranged in an exhaust gas route of a common rail type engine, and structured such that a plurality of renewing modes for burning and removing a particulate matter deposited in the exhaust gas purification device can be executed, wherein one of a plurality of renewing modes is an initialization renewing mode which supplies a fuel into the exhaust gas purification device by a post injection regardless of a clogged state of the exhaust gas purification device, in the case that an accumulated drive time of the engine becomes equal to or more than a previously set time.

According to a second aspect of the invention, there is provided the exhaust gas purification system as recited in the first aspect, further including renewal advance notifying means which calls attention for promoting execution of each of the renewing modes, and renewal admittance input means which allows the execution of each of the renewing modes, wherein in the case that the renewal admittance input means is in a non-operated state under operation of the renewal advance notifying means, the initialization renewing mode is not executed.

According to a third aspect of the invention, there is provided the exhaust gas purification system as recited in the second aspect, wherein the non-operated state of the renewal admittance input means carries on for a predetermined leaving time or more, the renewal advance notifying means is actuated by a warning aspect which is different from an operating aspect which promotes the execution of the initialization renewing mode.

According to a fourth aspect of the invention, there is provided the exhaust gas purification system as recited in the third aspect, wherein in the case that a power supply is shut off under operation of the renewal advance notifying means in the warning aspect, the operation of the renewal advance notifying means is restarted in the warning aspect after restoring the power supply.

According to a fifth aspect of the invention, there is provided the exhaust gas purification system as recited in the third or fourth aspect, further including traveling system operating means which operates a traveling system of a working machine which mounts the engine thereto, wherein in the case that the renewal advance notifying means is actuated in the warming aspect, by the thereafter allowing operation of the renewal admittance input means and the operation of the traveling system operating means in correspondence to a travel stop state of the working machine, the mode is changed to an emergency renewing mode which supplies the fuel into the exhaust gas purification device by the post injection and maintains an engine rotating speed at a predetermined value.

Advantageous Effect of Invention

According to the invention of the first aspect, since the exhaust gas purification system includes the exhaust gas purification device which is arranged in the exhaust gas route of the common rail type engine, and is structured such that a plurality of renewing modes for burning and removing the particulate matter deposited in the exhaust gas purification device can be executed, and one of a plurality of renewing modes is the initialization renewing mode which supplies the fuel into the exhaust gas purification device by the post injection regardless of the clogged state of the exhaust gas purification device, in the case that the accumulated drive time of the engine becomes equal to or more than the previously set time, it is possible to forcibly and efficiently burn and remove the particulate matter within the exhaust gas purification device by executing the initialization renewing mode without any setting operation by the operator, in the case that the engine is driven for a long time accumulatively. In other words, it is possible to lower an execution frequency of the forced renewing mode, that is, an execution frequency of the post injection. Therefore, there can be achieved an effect that it is possible to suppress a fuel consumption deterioration and to suppress a durability deterioration of the engine caused by an engine oil dilution, in spite of the fact that it is possible to efficiently initialize and renew the exhaust gas purification device.

According to the invention of the second aspect, since the exhaust gas purification system includes the renewal advance notifying means which calls attention for promoting execution of each of the renewing modes, and the renewal admittance input means which allows the execution of each of the renewing modes, and in the case that the renewal admittance input means is in the non-operated state under operation of the renewal advance notifying means, the initialization renewing mode is not executed, it is possible to inhibit the execution of the initialization renewing mode (the renewing motion of the exhaust gas purification device) by the intention of the operator depending on the state of the working machine to which the engine is mounted. Therefore, the initialization renewing mode is not executed in a state which the operator does not expect at all, and there can be achieved an effect that it is possible to smoothly carry out a careful work which the operator executes on the basis of the engine sound. In other words, it is possible to do away with a defect of the renewing motion of the exhaust gas purification device which may obstruct the careful work.

According to the invention of the third aspect, since in the case that the non-operated state of the renewal admittance input means carries on for the predetermined leaving time or more, the renewal advance notifying means is actuated by the warning aspect which is different from the operating aspect which promotes the execution of the initialization renewing mode, it is possible to call the operator's attention on the basis of the warning aspect which is different from the operating aspect which promotes the execution of the initialization renewing mode, in the case that the exhaust gas purification device is left for a long time as it is in the state in which the renewal thereof is necessary, and the particulate matter within the exhaust gas purification device is more likely to increase to an excessively deposited state. Accordingly, there can be achieve an effect that it is possible to prevent an excessive deposition of the particulate matter (further a runaway combustion).

According to the invention of the fourth aspect, since in the case that the power supply is shut off under operation of the renewal advance notifying means in the warning aspect, the operation of the renewal advance notifying means is restarted in the warning aspect after restoring the power supply, there can be achieved an effect that it is possible to securely avoid a risk that the exhaust gas purification device is used as it is in a state in which it is not sufficiently renewed.

According to the invention of the fifth aspect, since the exhaust gas purification system includes the traveling system operating means which operates the traveling system of the working machine which mounts the engine thereto, and in the case that the renewal advance notifying means is actuated in the warming aspect, by the thereafter allowing operation of the renewal admittance input means and the operation of the traveling system operating means in correspondence to the travel stop state of the working machine, the mode is changed to the emergency renewing mode which supplies the fuel into the exhaust gas purification device by the post injection and maintains the engine rotating speed at the predetermined value, it is possible to inhibit the change to the emergency renewing mode until the operator intentionally stops the traveling and the various works of the working machine. Therefore, there can be achieved an effect that it is possible to securely avoid an unexpected occurrence, for example, a rapid acceleration of the working machine, in the emergency renewing mode in which the engine rotating speed is widely increased.

BRIEF DESCRIPTION OF DRAWINGS

FIGS. 18A to 18C are explanatory views of flag tables in correspondence to the respective renewing modes, in which FIG. 18A is a view of a flag table for the self-renewing, FIG. 18B is a view of a flag table for the automatic auxiliary renewing, and FIG. 18C is a view of a flag table for the manual auxiliary renewing.

DESCRIPTION OF EMBODIMENTS

Figure 1:
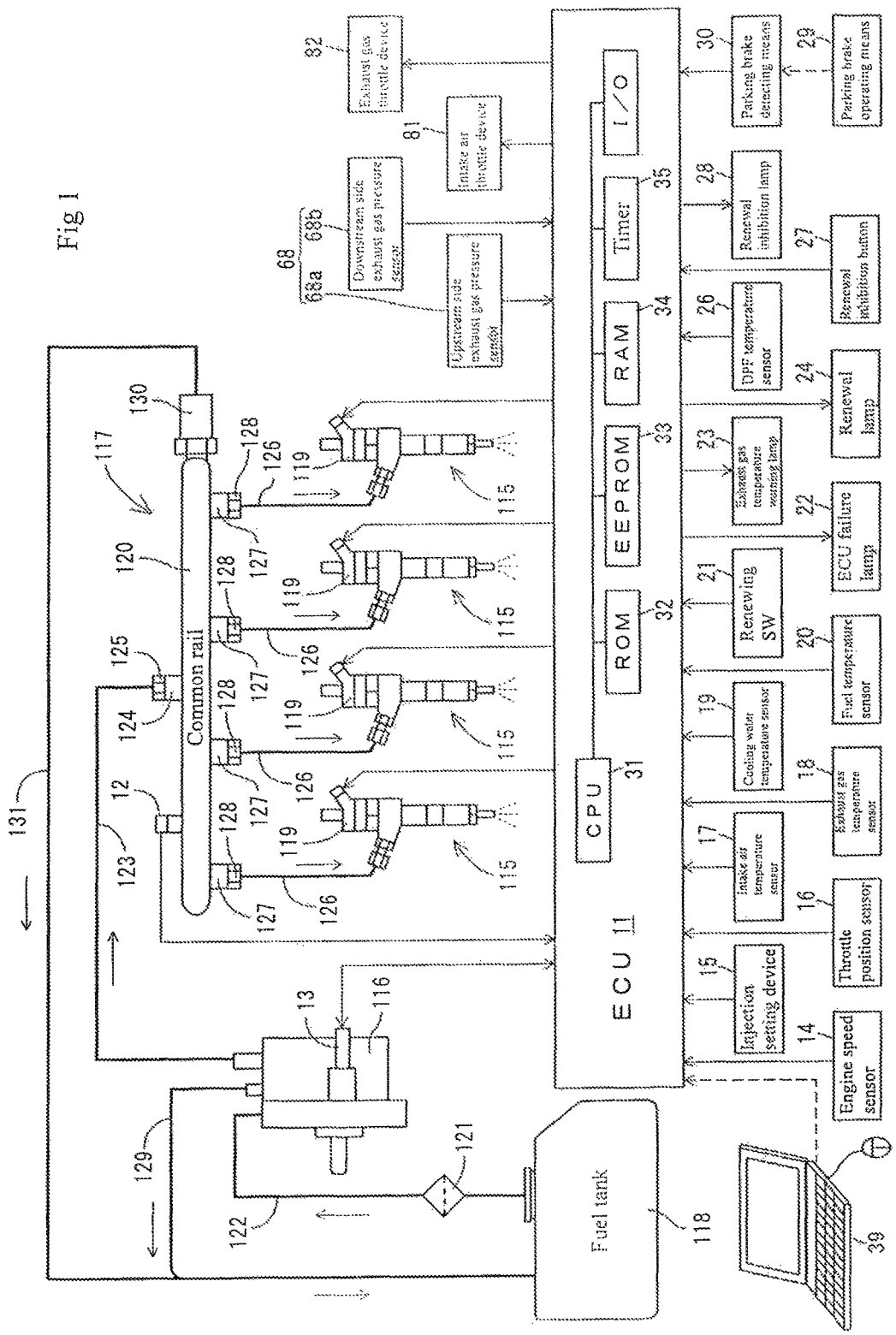
FIG. 1 is an explanatory view of a fuel system of an engine.

A description will be given below of an embodiment which embodies the present invention on the basis of the accompanying drawings.

(1) Engine and Peripheral Structure of the Same

Next, a description will be given of the engine 70 and a peripheral structure of the same, with reference to FIG. 1 and FIG. 2. As shown in FIG. 2, the engine 70 is the four-cylinder type diesel engine, and is provided with a cylinder block 75 in which a cylinder head 72 is fastened to an upper face. An intake manifold 73 is connected to one side face of the cylinder head 72, and an exhaust manifold 71 is connected to the other side face. A common rail system 117 which supplies a fuel to each of cylinders of the engine 70 is provided below the intake manifold 73 in a side face of the cylinder block 75. An intake air throttle device 81 for regulating an intake air pressure (an amount of intake air) of the engine 70 and an air cleaner (not shown) are connected to an intake pipe 76 which is connected to an air intake upstream side of the intake manifold 73.

Figure 2:
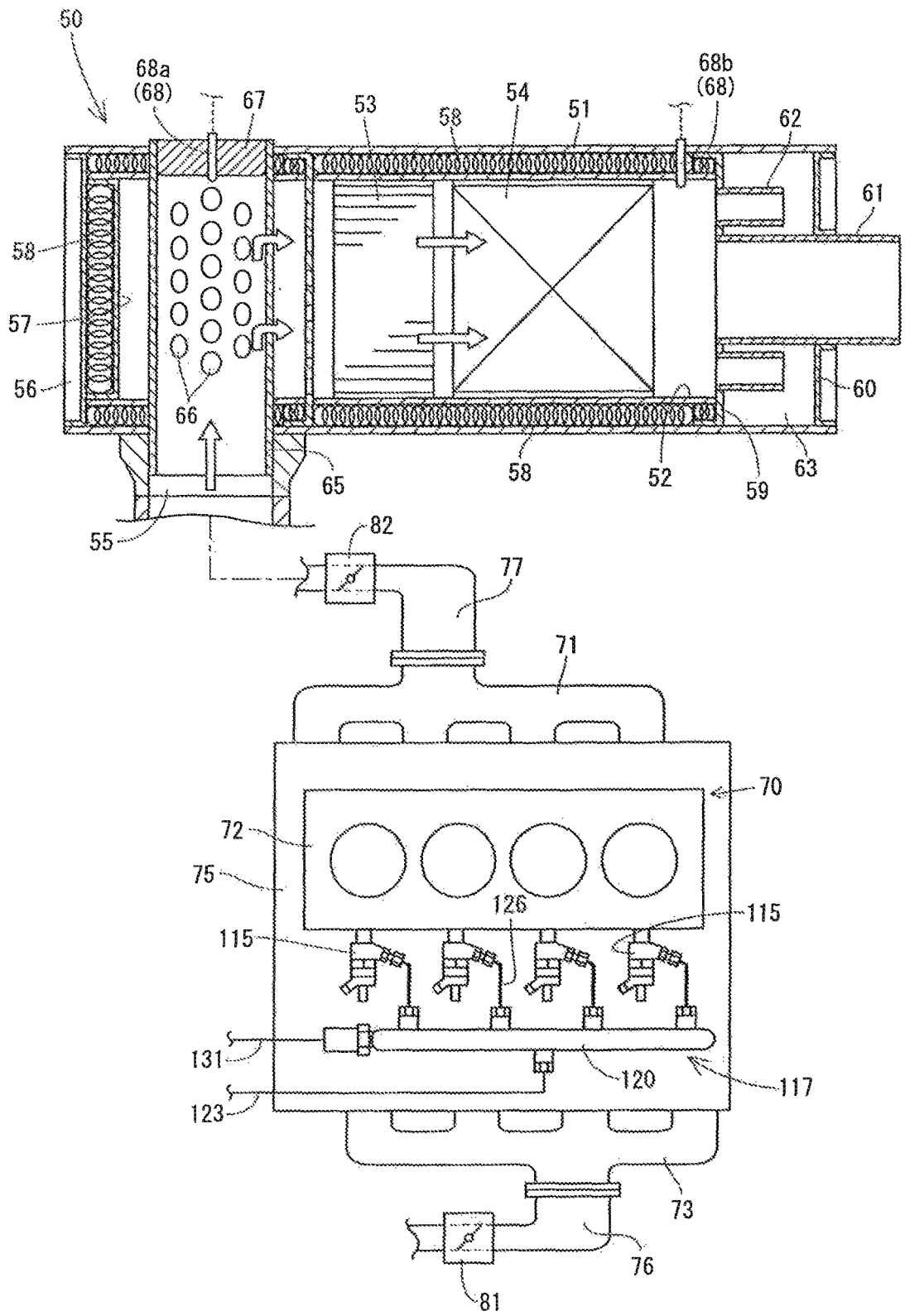
FIG. 2 is a function block diagram showing a relationship between the engine and an exhaust gas purification device.

As shown in FIG. 1, a fuel tank 118 is connected to each of injectors 115 for four cylinders in the engine 70 via a common rail system 117 and a fuel supply pump 116. Each of the injectors 115 is provided with a fuel injection valve 119 of an electromagnetically opening and closing control type. The common rail system 117 is provided with a cylindrical common rail 120. The fuel tank 118 is connected to an air intake side of the fuel supply pump 116 via a fuel filter 121 and a low pressure pipe 122. A fuel within the fuel tank 118 is sucked into the fuel supply pump 116 via the fuel filter 121 and the low pressure pipe 122. The fuel supply pump 116 of the embodiment is arranged in the vicinity of the intake manifold 73. On the other hand, the common rail 120 is connected to an air discharge side of the fuel supply pump 116 via a high pressure pipe 123. The injectors 115 for four cylinders are connected to the common rail 120 via four fuel injection pipes 126.

In the structure mentioned above, the fuel in the fuel tank 118 is pressure fed to the common rail 120 by the fuel supply pump 116, and the fuel having the high pressure is stored in the common rail 120. Each of the fuel injection valves 119 is controlled to be opened and closed, whereby the fuel having the high pressure within the common rail 120 is injected to each of the cylinders of the engine 70 from each of the injectors 115. In other words, an injection pressure, an injection timing, and an injection period (an injection amount) of the fuel which is supplied from each of the injectors 115 are controlled with a high precision. Accordingly, it is possible to reduce a nitrogen oxide (NOx) from the engine 70, and it is possible to reduce a noise vibration of the engine 70.

Figure 3:
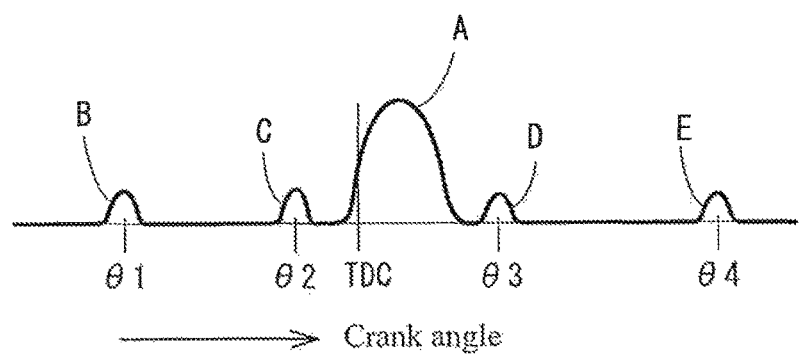
FIG. 3 is a view describing an injection timing of a fuel.
Figure 4:
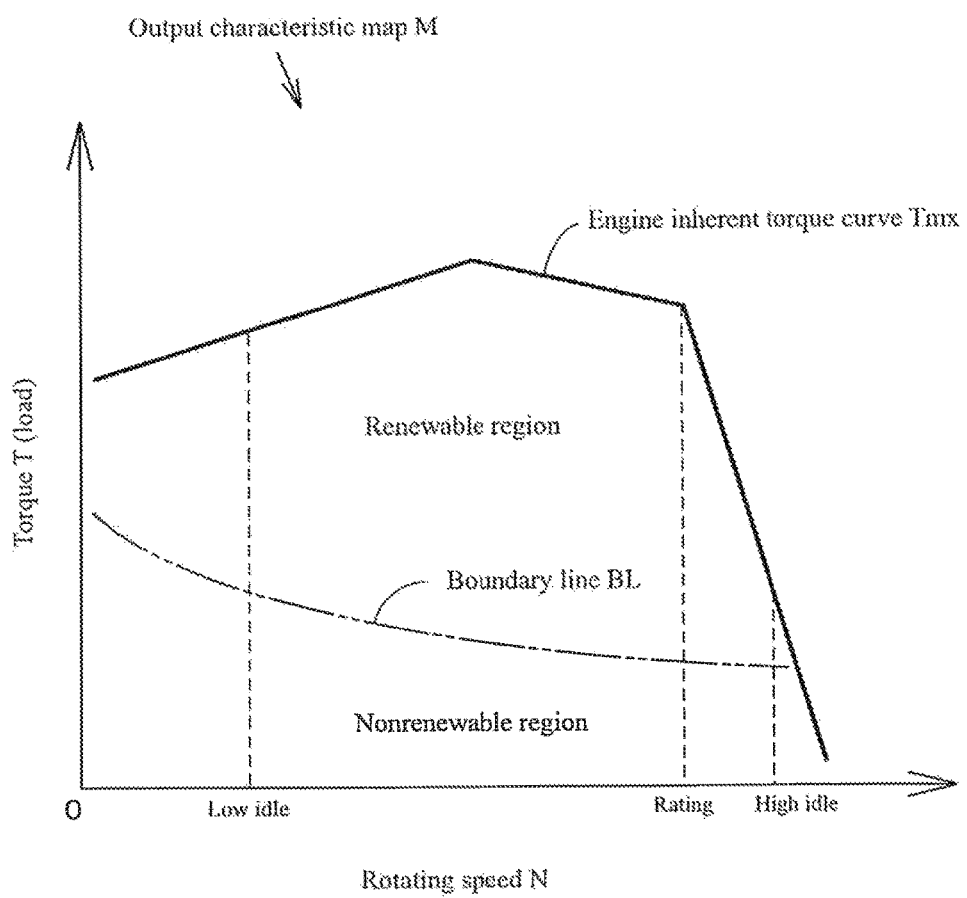
FIG. 4 is an explanatory view of an output characteristic map.

As shown in FIG. 3, the common rail system 117 is structured such as to execute a main injection A in the vicinity of a top dead center (TDC). Further, the common rail system 117 is structured such as to execute a small amount of pilot injection B for reducing the NOx and the noise at a moment of a crank angle θ1 which is about 60 degree before the top dead center, execute a pre injection C for reducing the noise at a moment of a crank angle θ2 which is just before the top dead center, and execute an after injection D and a post injection E for reducing a particulate matter (hereinafter, refer to as PM) and promoting a purification of the exhaust gas at a moment of crank angles θ3 and θ4 which are after the top dead center, in addition to the main injection A.

In this case, as shown in FIG. 1, the fuel supply pump 116 is connected to the fuel tank 118 via a fuel return pipe 129. A common rail return pipe 131 is connected to an end portion in a longitudinal direction of the cylindrical common rail 120 via a return pipe connector 130 which controls a pressure of the fuel within the common rail 120. In other words, a surplus fuel in the fuel supply pump 116 and a surplus fuel in the common rail 120 are recovered in the fuel tank 118 via the fuel return pipe 129 and the common rail return pipe 131.

To an exhaust pipe 77 which is connected to a downstream side of an exhaust gas in the exhaust manifold 71, there are connected an exhaust gas throttle device 82 for regulating an exhaust gas pressure of the engine 70, and a diesel particulate filter (hereinafter, refer to as DPF) 50 which corresponds to one example of the exhaust gas purification device. The exhaust gas discharged from each of the cylinders to the exhaust manifold 71 is discharged to an outside after being applied a purifying process via the exhaust pipe 77, the exhaust; gas throttle device 82 and the DPF 50.

The DPF 50 is provided for collecting the PM or the like in the exhaust gas. The DPF 50 of the embodiment is structured such that a diesel oxidation catalyst 53, for example, a platinum or the like, and a soot filter 54 are arranged in series and accommodated in an approximately tubular filter case 52 within a casing 51 which is made of a heat resisting metal material. In the embodiment, the diesel oxidation catalyst 53 is arranged in an upstream side of the exhaust gas within the filter case 52, and the soot filter 54 is arranged in a downstream side of the exhaust gas. The soot filter 54 is formed as a honeycomb structure having a lot of cells which are sectioned by a porous (filterable) partition wall.

One side portion of the casing 51 is provided with an exhaust gas introduction port 55 which is communicated with the downstream side of the exhaust gas from the exhaust gas throttle device 82 among the exhaust pipe 77. One end portion of the casing 51 is occluded by a first bottom plate 56, and one end portion facing to the first bottom plate 56 among the filter case 52 is occluded by a second bottom plate 57. A heat insulating material 58 such as a glass wool is filled in an annular gap between the casing 51 and the filter case 52, and a gap between both the bottom plates 56 and 57, in such a manner as to surround a periphery of the diesel oxidation catalyst 53 and the soot filter 54. The other side portion of the casing 51 is occluded by two lid plates 59 and 60, and an approximately tubular exhaust gas discharge port 61 passes through both the lid plates 59 and 60. Further, a portion between both the lid plates 59 and 60 is a resonance chamber 63 which is communicated with an inner side of the filter case 52 via a plurality of communication pipes 62.

An exhaust gas introduction pipe 65 is inserted to the exhaust gas introduction port 55 which is formed in the one side portion of the casing 51. A leading end of the exhaust gas introduction pipe 65 protrudes to a side face in an opposite side to the exhaust gas introduction port 55 while cutting across the casing 51. A plurality of communication holes 66 which are open toward the filter case 52 are formed in an outer peripheral surface of the exhaust gas introduction pipe 65. A portion protruding to the side face in the opposite side to the exhaust gas introduction port 55 among the exhaust gas introduction pipe 65 is occluded by a lid body 67 which is detachably attached by screw thereto.

The DPF 50 is provided with a DPF temperature sensor 26 which detects a temperature of the exhaust gas within the DPF 50, as one example of detecting means. The DPF temperature sensor 26 of the embodiment is installed while passing through the casing 51 and the filter case 52, and a leading end of the DPF temperature sensor 26 is positioned between the diesel oxidation catalyst 53 and the soot filter 54.

Further, the DPF 50 is provided with a differential pressure sensor 68 which detects a clogged state of the soot filter 54, as one example of the detecting means. The differential pressure sensor 68 of the embodiment is structured such as to detect a pressure difference (a differential pressure) between upstream and downstream sides with respect to the soot filter 54 within the DPF 50. In this case, an upstream side exhaust gas pressure sensor 68a constructing the differential pressure sensor 68 is installed to the lid body 67 of the exhaust gas introduction pipe 65, and a downstream side exhaust gas pressure sensor 68b is installed between the soot filter 54 and the resonance chamber 63. It has been well known that a definite principle exists between the pressure difference between the upstream and downstream sides of the DPF 50, and a PM deposition amount within the DPF 50. In the embodiment, a renewing control (a DPF renewing control) of the soot filter 54 is executed by estimating the PM deposition amount within the DPF 50 from the pressure difference which is detected by the differential pressure sensor 68, and actuating the intake air throttle device 81 and the common rail 120 on the basis of the estimated result.

In this case, the clogged state of the soot filter 54 may be detected by an exhaust gas pressure sensor which detects the pressure in the upstream side of the soot filter 54 within the DPF 50, without being limited to the differential pressure sensor 68. In the case that the exhaust gas pressure sensor is employed, the clogged state of the soot filter 54 is determined by comparing a pressure (a reference pressure) in the upstream side of the soot filter 54 under a brand-new state in which the PM is not deposited up in the soot filter 54, with the current pressure which is detected by the exhaust gas pressure sensor.

In the structure mentioned above, the exhaust gas from the engine 70 enters into the exhaust gas introduction pipe 65 via the exhaust gas introduction port 55, is spouted out into the filter case 52 from each of the communication holes 66 which are formed in the exhaust gas introduction pipe 65, is dispersed into a wide region within the filter case 52, and thereafter passes through the diesel oxidation catalyst 53 and the soot filter 54 in this order so as to be purified. The PM in the exhaust gas cannot pass through the porous partition wall between the cells in the soot filter 54 at this stage, and is collected. Thereafter, the exhaust gas passing through the diesel oxidation catalyst 53 and the soot filter 54 is discharged from the exhaust gas discharge port 61.

If the temperature of the exhaust gas exceeds a renewal boundary temperature (for example, about 300° C.) at a time when the exhaust gas passes through the diesel oxidation catalyst 53 and the soot filter 54, NO (nitrogen monoxide) in the exhaust gas is oxidized into an unstable $NO_2$ (nitrogen dioxide) on the basis of an action of the diesel oxidation catalyst 53. Further, a PM collecting capacity of the soot filter 54 is recovered (the DPF 50 is renewed) by oxidation removing the PM which is deposited in the soot filter 54, with O (oxygen) that $NO_2$ discharges at a time of returning to NO.

(2) Structure Relevant to Control of Engine

Next, a description will be given of a structure which is relevant to a control of the engine 70 with reference to FIG. 1 to FIG. 5. As shown in FIG. 1, there is provided with an ECU 11 which actuates the fuel injection valve 119 in each of the cylinders in the engine 70. The ECU 11 has ROM 32 which previously stores various data in a fixed manner, EEPROM 33 which stores control programs and the various data in a rewritable manner, RAM 34 which temporarily stores the control programs and the various data, a timer 35 for measuring a time, and an input and output interface and the like, in addition to CPU 31 which executes various arithmetic processes and controls, and is arranged in the engine 70 or in the vicinity thereof.

To an input side of the ECU 11, there are connected at least a rail pressure sensor 12 which detects the fuel pressure within the common rail 120, an electromagnetic clutch 13 which rotates or stops the fuel supply pump 116, an engine speed sensor 14 which detects a rotating speed of the engine 70 (a position of a cam shaft of a crank shaft 74), an injection setting device 15 which detects and sets a fuel injection frequency (a frequency in one stroke fuel injection period) of the injector 115, a throttle position sensor 16 which detects an operating position of an accelerator operating device (not shown), an intake air temperature sensor 17 which detects a temperature of the intake air in an intake air route, an exhaust gas temperature sensor 18 which detects a temperature of the exhaust gas in an exhaust gas route, a cooling water temperature sensor 19 which detects a temperature of a cooling water in the engine 70, a fuel temperature sensor 20 which detects a temperature of the fuel within the common rail 120, a renewing switch 21 serving as renewal admittance input means which selects and operates whether an emergency renewing mode mentioned later can be executed, the differential pressure sensor 68 (the upstream side exhaust gas pressure sensor 68a and the downstream side exhaust gas pressure sensor 68b), a DPF temperature sensor 26 which detects a temperature of the exhaust gas within the DPF 50, a renewal inhibition button 27 serving as renewal inhibition input means which inhibits a renewing motion of the DPF 50, and parking brake detecting means 30 which detects an on-off state of parking brake operating means 29 (whether the parking brake operating means 29 is in the braked state) which maintains and operates the working machine in a braked state. The parking brake operating means 29 is one example of the traveling system operating means which operates the traveling system of the working machine.

Each of electromagnetic solenoids of the fuel injection valves 119 for at least four cylinders is connected to an output side of the ECU 11. In other words, it is structured such that the high-pressure fuel stored in the common rail 120 is injected from the fuel injection valve 119 separately at a plurality of times in one stroke while controlling a fuel injection pressure, an injection timing and an injection period, thereby suppressing the nitrogen oxide (NOx) from being generated, executing a complete combustion in which the generation of the soot and a carbon dioxide is reduced, and improving a fuel consumption.

Figure 5:
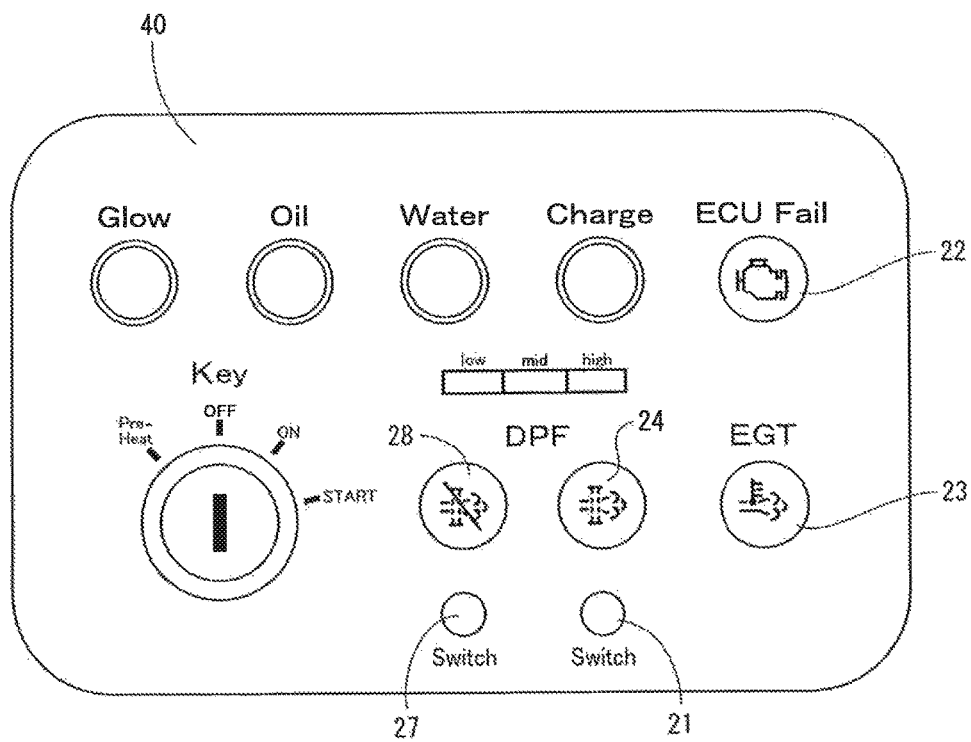
FIG. 5 is an explanatory view of an instrument panel.

Further, to an output side of the ECU 11, there are connected the intake air throttle device 81 for adjusting an intake air pressure (an intake air amount) of the engine 70, the exhaust gas throttle device 82 for adjusting an exhaust gas pressure of the engine 70, an ECU failure lamp 22 which gives a warning and informs of a failure of the ECU 11, an exhaust gas temperature warning lamp 23 serving as abnormally high temperature informing means which informs of abnormally high temperature of the exhaust gas within the DPF 50, a renewal lamp 24 which turns on with a renewing motion of the DPF 50, and a renewal inhibition lamp 28 serving as renewal inhibition informing means which is actuated during a pushing operation of the renewal inhibition button 27 (an inhibiting operation). Data relating to blinking of each of the lamps 22 to 24 and 28 is previously stored in the EEPROM 33 of the ECU 11. Though details will be mentioned later, the renewal lamp 24 constructs a single display device serving as renewal advance notifying means which is actuated if the clogged state of the DPF 50 becomes equal to or more than a prescribed level, and renewal informing means which informs of the matter that the DPF 50 is under renewing motion. In this case, as shown in FIG. 5, the renewing switch 21, the renewal inhibition button 27 and each of the lamps 22 to 24 and 28 are provided in an instrument panel 40 which exists in a working machine to which the engine 70 is mounted.

The renewing switch 21 belongs to an alternate motion type. In other words, the renewing switch 21 is a lock type push switch which is locked at a pushdown position by one push-down motion, and is returned to the original position by one more push-down motion. If the renewing switch 21 is pushed down, the mode can be changed to each of the renewing modes mentioned later. The renewal inhibition button 27 belongs to a momentary motion type. In other words, the renewal inhibition button 27 is a non-lock type push switch which emits one ON pulse signal by one push-down motion. While the operator pushes down the renewal inhibition button 27a current drive state in the engine 70 is inhibited and the execution of the automatic auxiliary renewing mode and the reset renewing mode is inhibited. While the operator pushes down the renewal inhibition button 27, a forced drive of the engine 70 and a post injection such that the temperature of the exhaust gas rises are prevented.

An output characteristic map M (refer to FIG. 3) indicating a relationship between a rotating speed N and a torque T (a load) of the engine 70 is previously stored in the EEPROM 33 of the ECU 11. A main program MPM (refer to FIG. 6) and a general-purpose renewing program GPM (refer to FIG. 7) are previously stored in the EEPROM 33, the main program MPM relating to the renewing control of the DPF 50, and the general-purpose renewing program GPM selectively executing any one of a plurality of renewing modes. Flows of the programs MPM and GPM will be mentioned later.

The output characteristic map M is determined by an experiment or the like. In the output characteristic map M shown in FIG. 3, the rotating speed N is employed as a transverse axis, and the torque T is employed as a vertical axis. The output characteristic map M is a region which is surrounded by a solid line Tmx drawn convex upward. The solid line Tmx is a maximum torque line which indicates a maximum torque with respect to each of the rotating speed N. In this case, if the type of the engine 70 is the same, the output characteristic maps M stored in the ECU 11 are identical (common). As shown in FIG. 3, the output characteristic map M is segmented up and down by a boundary line BL which expresses a relationship between the rotating speed N and the torque T in the case that the temperature of the exhaust gas is a renewal boundary temperature (about 300° C.). A region in an upper side with respect to the boundary line BL is a renewable region in which the PM deposited in the soot filter 54 can be oxidized and removed (in which an oxidizing action of the oxidation catalyst 53 works), and a region in a lower side is a nonrenewable region in which the PM is deposited in the soot filter 54 without being oxidized and removed.

The ECU 11 basically executes a fuel injection control which computes the torque T on the basis of the output characteristic map M, the rotating speed N which is detected by the engine speed sensor 14, and the throttle position which is detected by the throttle position sensor 16 so as to determine a target fuel injection amount, and actuates the common rail system 117 on the basis of the result of computation. In this case, the fuel injection amount is adjusted by adjusting a valve open period of each of the fuel injection valves 119, and changing an injection period into each of the injectors 115.

A flag table FT corresponding to each of the renewing modes with regard to the renewing control of the DPF 50 is previously stored in the ROM 32 of the ECU 11. As shown in FIGS. 18A to 18C, the flag table FT exists by kind of the renewing modes, and serves as an identification factor of the renewing mode. One kind of flag table FT by kind of the renewing mode, that is, in correspondence to the working machine to which the engine is mounted is written in the ROM 32 of the embodiment, before shipping the engine (at the manufacturing time of the engine), by using an external tool 39 such as a ROM writer which is connected to the ECU 11 via a communication terminal line.

In the case that the subject to which the engine is mounted is, for example, an engine generator, a self-renewing flag table FT1 (refer to FIG. 18A) corresponding to the self-renewing mode is stored in the ROM 32. In the case that the subject to which the engine is mounted is, for example, a combine harvester, an automatic auxiliary renewing flag table FT2 (refer to FIG. 18B) corresponding to the automatic auxiliary renewing mode is stored in the ROM 32. In the case that the subject to which the engine is mounted is, for example, a hydraulic shovel, a manual auxiliary renewing flag table FT3 (refer to FIG. 18C) corresponding to the manual auxiliary renewing mode is stored in the ROM 32. In the case that the flag table is expressed by kind as the description mentioned above, a relationship to the corresponding renewing mode is expressed by attaching numerical character to code FT, and in the case that the flag tables are expressed in a lump or the optional flag table is expressed, "FT" having no numerical character is used.

One kind of flag table FT stored in the ROM 32 is written (copied) in the EEPROM 33 side at a time of a first accessing time between the ROM 32 and the EEPROM 33, that is, at a time when the ROM 32 and the EEPROM 33 are electrically connected by supplying power to the working machine for the first time. The writing process is carried out when the ECU 11 executes the main program MPM (refer to FIG. 6). The ECU 11 selects the renewing mode on the basis of the flag table FT which is written in the EEPROM 33 side, and executes the general-purpose renewing program GPM in the selected renewing mode (refer to FIG. 7).

As the control mode (the renewing mode) of the engine 70, there are a self-renewing mode which drives the engine 70 under a condition that the DPF 50 can be renewed, an automatic auxiliary renewing mode which automatically raises a temperature of the exhaust gas if the clogged state of the DPF 50 becomes equal to or more than a prescribed level, a forced renewing mode (which may be called as an initialization renewing mode) which supplies the fuel into the DPF 50 by the post injection E, an automatic or manual emergency renewing mode which supplies the fuel into the DPF 50 by the post injection E and maintains the rotating speed N of the engine 70 at a high idle rotating speed, and a limp home mode which makes the engine 70 a minimum drive state (makes the working machine secure a minimum traveling function).

The self-renewing mode is mainly used in the working machine such as the engine generator or the like which drives the engine 70 at the approximately constant rotating speed N and torque T. In the working machine such as a combine harvester, a tractor or a hydraulic shovel, a normal drive mode in which a road travel and various works are carried out is executed, and the normal drive mode can be said to be one kind of the self-renewing mode. The automatic auxiliary renewing mode is mainly used in a general working machine such as a combine harvester or a tractor. The manual auxiliary renewing mode is mainly used in a working machine such as a hydraulic shovel which executes the careful work on the basis of the engine sound. In this case, "under renewable condition" in the self-renewing mode means a state in which the relationship between the rotating speed N and the torque T in the engine 70 is in a renewable region (an upper region with respect to the boundary line BL) of the output characteristic map M, and the temperature of the exhaust gas of the engine 70 is such a high level that an oxidation amount of the PM within the DPF 50 is greater than a PM collection amount.

In the automatic or manual auxiliary renewing mode, the intake air amount and the exhaust gas amount are restricted, by closing at least one of an intake air throttle device 81 and an exhaust gas throttle device 82 to a predetermined opening degree, on the basis of the detected information of a differential pressure sensor 68. Accordingly, since a load of the engine 70 is increased, an output of the engine 70 is increased in conjunction with this, and the temperature of the exhaust gas from the engine 70 is raised. As a result, the PM within the DPF 50 (the soot filter 54) can be burnt and removed.

The forced renewing (initialization renewing) mode is executed in the case that the clogged state of the DPF 50 is not improved (the PM remains) even by executing the automatic or manual auxiliary renewing mode, or in the case that an accumulated drive time Te of the engine 70 exceeds a set time T0 (for example, about 100 hours). In the forced renewing mode, the temperature of the exhaust gas within the DPF 50 is raised (about 560° C.) by supplying the fuel into the DPF 50 by the post injection and burning the fuel by the diesel oxidation catalyst 53. As a result, the PM within the DPF 50 (the soot filter 54) can be forcibly burnt and removed.

The emergency renewing mode is executed in the case that the clogged state of the DPF 50 is not improved even by executing the forced renewing mode. In the emergency renewing mode, in addition to the control aspect (the execution of the post injection E) in the forced renewing mode mentioned above, the temperature of the exhaust gas from the engine 70 is raised by maintaining the rotating speed N of the engine 70 at a high idle rotating speed (a maximum rotating speed), and the temperature of the exhaust gas is raised by the post injection E within the DPF 50 (about 600° C.). As a result, the PM within the DPF 50 (the soot filter 54) can be forcibly burnt and removed under more preferable condition than the forced renewing mode.

The limp home mode is executed in the case that the clogged state of the DPF 50 is not improved even by executing the emergency renewing mode and the PM is excessively deposited (a possibility of a PM runaway combustion is high), or in the case that a PM runaway combustion is generated within the DPF 50. In the limp home mode, the engine 70 is held in the minimum drive state, by restricting an upper limit value of the output (the rotating speed N and the torque T) of the engine 70 and a drivable time of the engine 70. As a result, it is possible to get out the working machine, for example, from a work area or move the working machine to a dealership or a service center. In other words, it is possible to secure a minimum traveling function in the working machine.

As is understood from the description of each of the modes mentioned above, for example, the engine 70, the intake air throttle device 81, the exhaust gas throttle device 82 and the common rail system 117 are the members which involved in the renewing motion of the DPF 50. These elements 70, 81, 82 and 117 construct the renewing device for burning and removing the PM within the DPF 50.

(3) Aspect of Main Process

Figure 6:
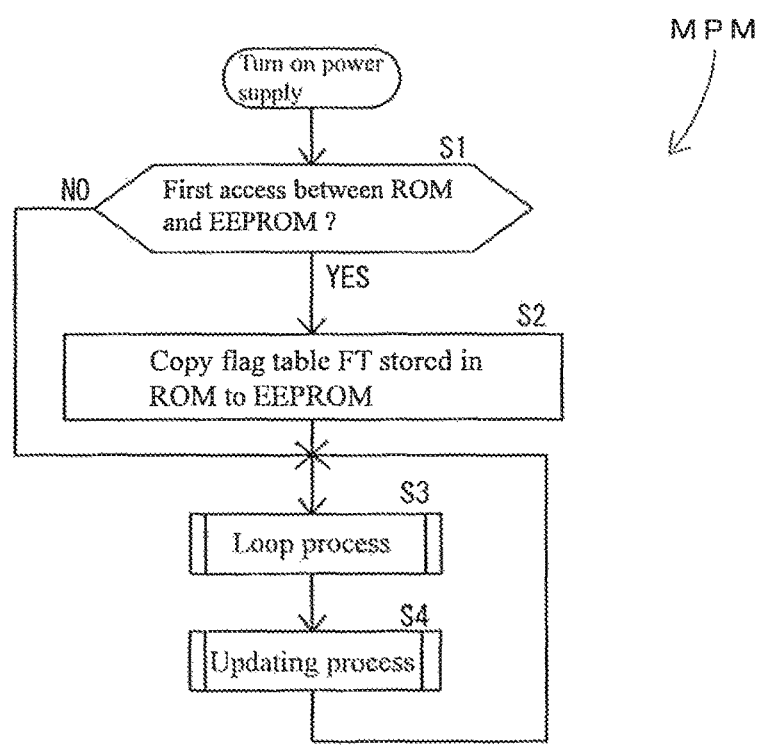
FIG. 6 is a flow chart showing a flow of a basic program with regard to a DPF renewing control.

Next, a description will be given of one example of the main process of the DPF renewing control by the ECU 11 with reference to a flow chart in FIG. 6. An algorithm shown by the flow chart in FIG. 6 is stored as the main program MPM in the EEPROM 33, and is executed by the CPU 31 while being called by the RAM 34. In this case, the main program MPM is started by supplying power to the working machine, and if the access between the ROM 32 and the EEPROM 33 is for the first time (S1: YES), one kind of flag table FT stored in the ROM 32 is written in the EEPROM 33 side (S2). Next, the general-purpose renewing program. GPM is called and, the renewing mode is selected on the basis of the flag table FT which is written in the EEPROM 33 side, and executes a loop process (the DPF renewing control) on the basis of the general-purpose renewing program GPM in the selected renewing mode (S3). Thereafter, if the external tool 39 is connected to the ECU 11, an updating process which rewrites the data (the flag table FT, the general-purpose renewing program GPM or the like) stored in the EEPROM 33 is executed, by using the external tool 39 (S4).

According to the control mentioned above, since the DPF renewing control can be easily executed according to the different renewing mode from the initial setting by later rewriting the flag table FT which is stored in the EEPROM 33, it is unnecessary to delete the flag table FT, for example, each time the ROM 32 is exchanged, or rewrite the general-purpose renewing program GPM, in the case that it is desired to change the renewing mode. Therefore, there can be achieved an effect that it is easy to cope with the systems of the various working machines. For example, for a customer (an engine purchasing manufacturer), it is easy to modify to a setting which is suitable for a private specification, in spite of the engine 70 which is purchased from the external portion.

(4) First Embodiment of Loop Process

Next, a description will be given of a first embodiment of the loop process of the DPF renewing control by the ECU 11, with reference to flow charts in FIG. 7, FIG. 8, FIG. 12 and FIG. 14. The first embodiment shows the case that the engine 70 is mounted to a working machine (for example, the engine generator) of a type which executes the self-renewing mode. In this kind of working machine, since the engine 70 is driven by the approximately constant rotating speed N and torque T, the temperature of the exhaust gas in the engine 70 comes to a high temperature in such a degree that the oxidation amount of the PM within the DPF 50 exceeds the collecting amount of the PM. Taking into consideration of this point, in the engine device of the first embodiment, the intake air throttle device 81, the exhaust gas throttle device 82, the renewing switch 21, the renewal inhibition button 27 and the renewal inhibition lamp 28 are omitted.

The algorithm shown by the flow charts in FIG. 7, FIG. 8, FIG. 12 and FIG. 14 is stored as the general-purpose renewing program GPM in the EEPROM 33. All of the flow chart of the self-renewing mode in FIG. 8, the flow chart of the automatic emergency renewing mode in FIG. 12, and the flow chart of the failure diagnosis process in FIGS. 16A and 16B are sub routines of the general-purpose renewing program GPM. The general-purpose renewing program GPM is read out of the EEPROM 33 to the RAM 34 so as to be executed by the CPU 31. In this case, the general-purpose renewing program GPM is used in common in a second embodiment and a third embodiment which are mentioned later, although sub routines (refer to FIG. 8 to FIG. 16) are changed in correspondence to difference of the renewing mode.

Figure 8:
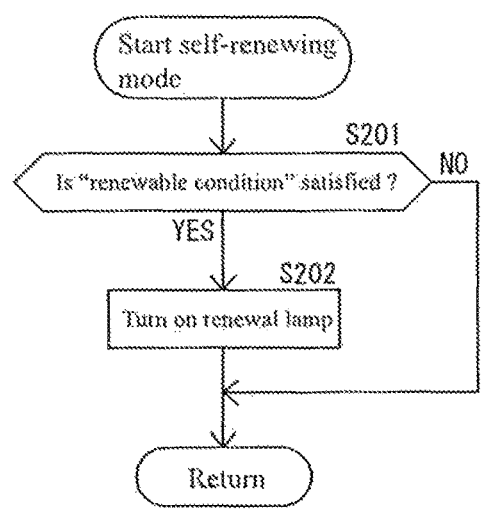
FIG. 8 is a flow chart of a self-renewing mode.
Figure 12:
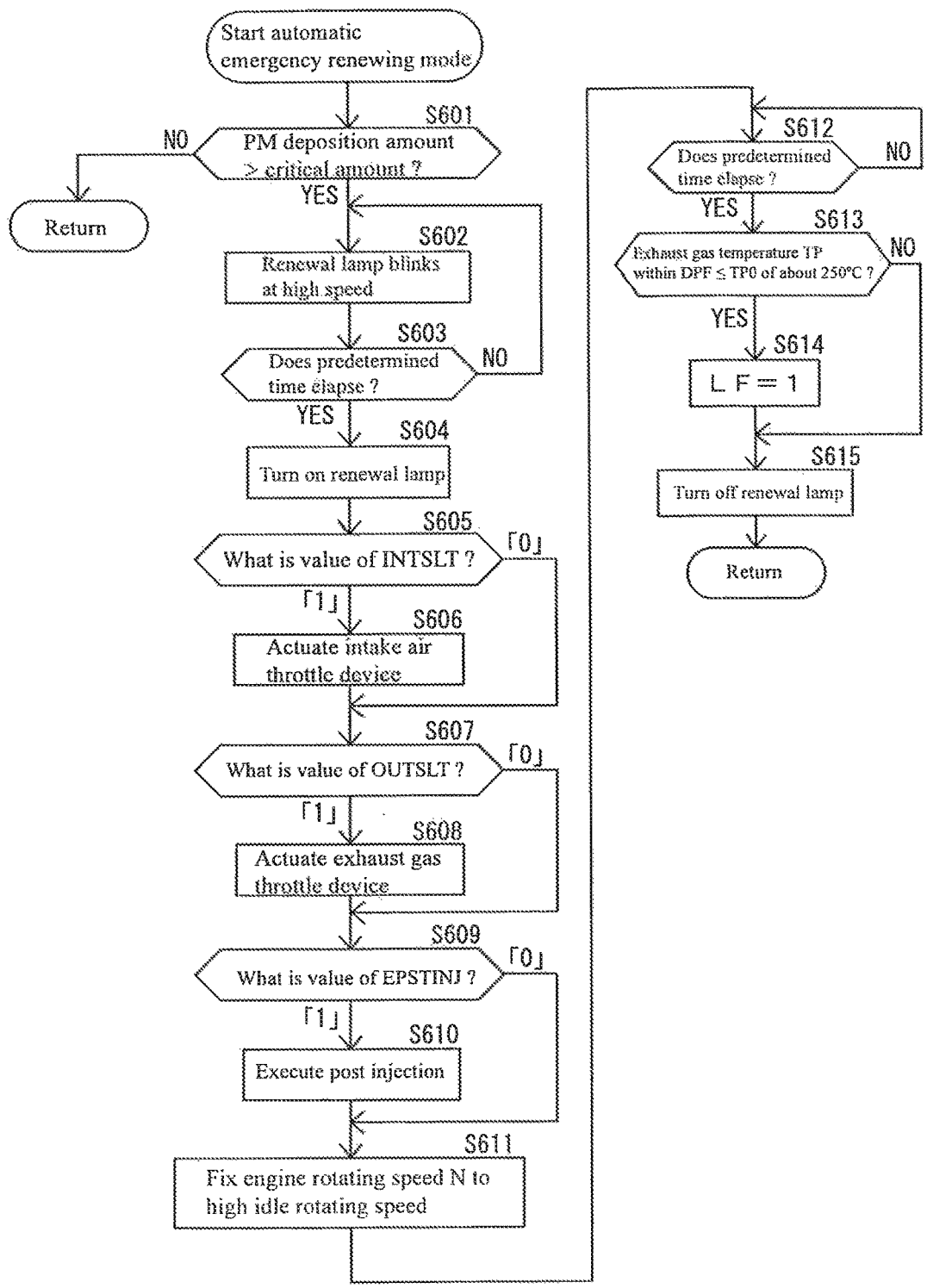
FIG. 12 is a flow chart of an automatic emergency renewing mode.

In the loop process of the first embodiment, firstly, a value of a mode selection flag RGMOD in the self-renewing flag table FT1 which is read out of the EEPROM 33 is determined (S11). In the first embodiment, since the value of the mode selection flag RGMOD is "0", the sub routine of the self-renewing mode shown in FIG. 8 is called, and the self-renewing process is executed (S12). In the sub routine of the self-renewing mode, it is determined whether the DPF 50 is "under renewable condition" (S201). If it is "under renewable condition" (S201: YES), the renewal lamp 24 on the instrument panel 40 is turned on (S202), and the fact that the self-renewal of the DPF 50 is performed smoothly is informed to the operator. Then, the step goes back to the main routine of the loop process, and a value of an emergency renewing flag EMMOD in the self-renewing flag table FT1 is determined (S15). Since EMMOD="0" is established in the self-renewing flag table FT1, the sub routine shown in FIG. 12 is called, and the step changes to the automatic emergency renewing process (S16).

In the self-renewing mode, as mentioned above, the temperature of the exhaust gas of the engine 70 is high in such a degree that the oxidation amount of the PM within the DPF 50 exceeds the PM collection amount. In the sub routine of the automatic emergency renewing mode shown in FIG. 12, firstly, it is determined whether a deposition amount of the PM within the DPF 50 estimated from a detection result of the differential pressure sensor 68 is equal to or more than a critical amount (a critical level) (S601). However, since there is a small risk of the PM excessive deposition in the self-renewing mode, and the PM is basically less than the critical amount (S601: NO), a substantial automatic emergency renewing process is not carried out, and the step goes back to the main routine of the loop process. Details of the flow of the automatic emergency renewing mode will be described in the second embodiment later.

Figure 14:
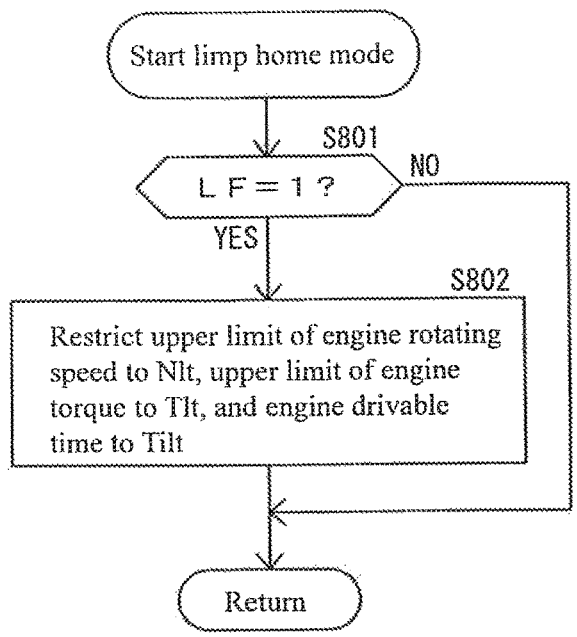
FIG. 14 is a flow chart of a limp home mode.

Then, the sub routine shown in FIG. 14 is called, and the step changes to the limp home process (S17). In the sub routine of the limp home mode shown in FIG. 14, firstly, it is determined whether a limp home flag LF is set (S801). However, since there is a small risk of the PM excessive deposition basically in the self-renewing mode, and LF="0" is established (S801: NO), the substantial limp home process is not carried out, and the step goes back to the main routine of the loop process. Details of the flow of the limp home mode will be also mentioned in the second embodiment later in the same manner as the automatic emergency renewing mode.

Thereafter, in the main routine of the loop process, the value of the mode selection flag RGMOD is determined again (S19), the sub routine shown in FIG. 16A is called because RGMOD="0" is established in this case, and a first failure diagnosis process is executed (S20). As mentioned above, since an engine auxiliary machine which is utilized for renewing the DPF 50, that is, the intake air and exhaust gas throttle devices 81 and 82 are omitted, in the working machine of the type which executes the self-renewing mode, the equipment to be diagnosed failure does not exist. Therefore, as shown in the flow chart in FIG. 16A, the step finishes without doing anything in the first failure diagnosis, and goes back to the main routine of the loop process so as to complete.

(5) Second Embodiment of Loop Process

Next, a description will be given of the second embodiment of the loop process of the DPF renewing control by the ECU 11 with reference to the flow charts in FIG. 7, FIG. 9, FIG. 11, FIG. 12, FIG. 14 and FIG. 16, and a transition view in FIG. 18. The second embodiment shows the case that the engine 70 is mounted to a working machine (for example, the combine harvester) of a type which executes the automatic auxiliary renewing mode. In the automatic auxiliary renewing mode, since the temperature of the exhaust gas is automatically raised in the case that the clogged state of the DPF 50 exceeds the prescribed level, the intake air and exhaust gas throttle devices 81 and 82 are provided in the exhaust gas purification system of the second embodiment, however, the renewing switch 21 which selects on the basis of the intention of the operator whether the renewing mode is executed is omitted.

Figure 7:
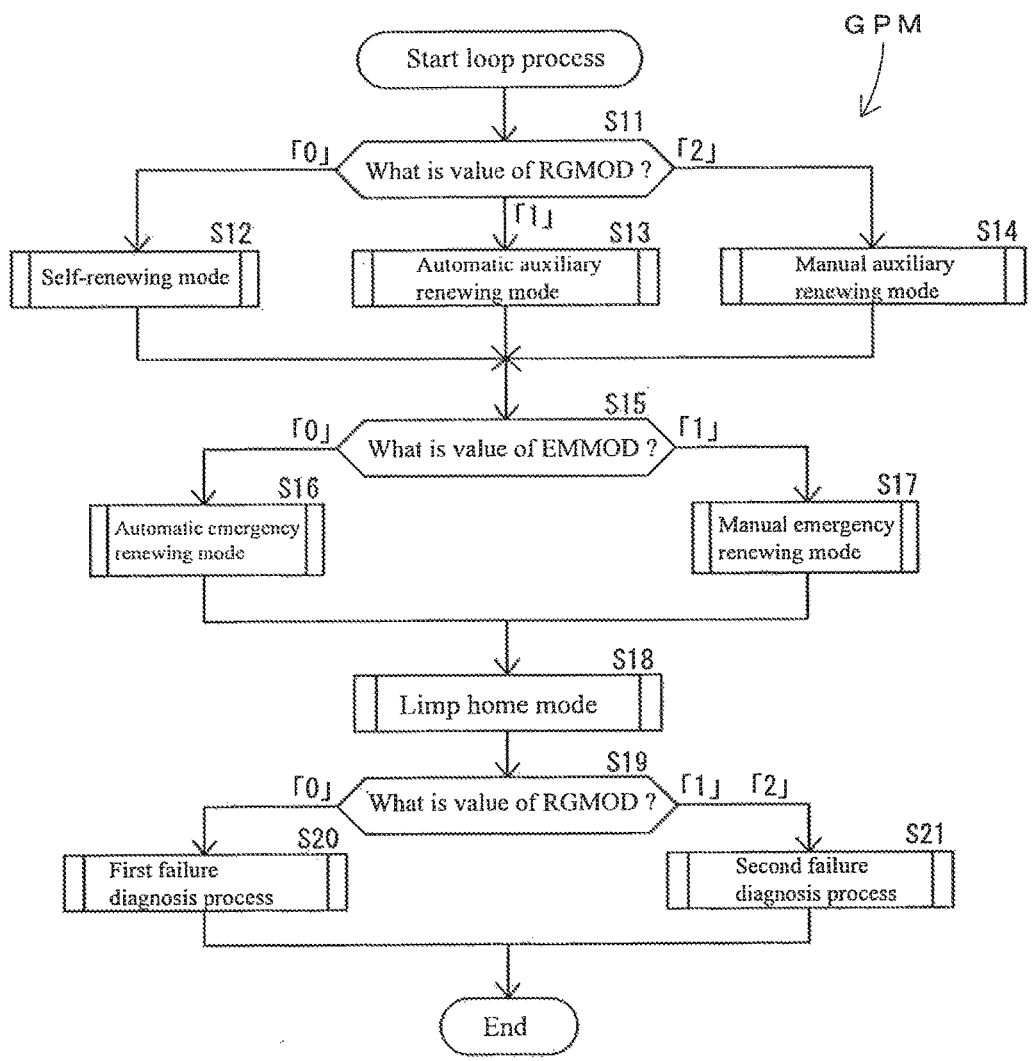
FIG. 7 is a flow chart showing a flow of a general-purpose renewing program.
Figure 9:
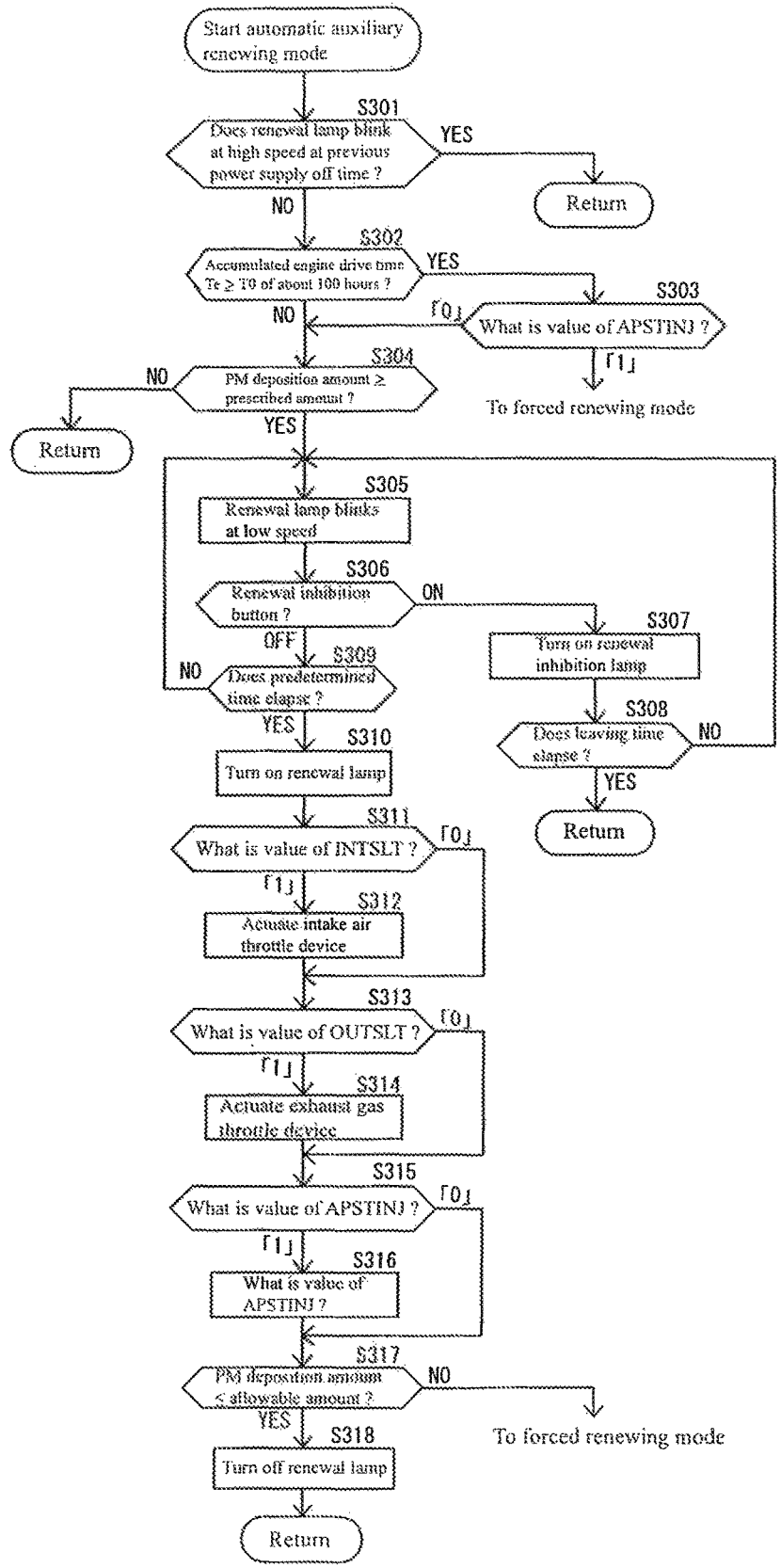
FIG. 9 is a flow chart of an automatic auxiliary renewing mode.

In the loop process of the second embodiment shown in FIG. 7, since RGMOD="1" is established at a time of determining a value of the mode selection flag RGMOD (S11), the sub routine of the automatic auxiliary renewing mode shown in FIG. 9 is called, and the automatic auxiliary renewing process is executed (S13). In the sub routine of the automatic auxiliary renewing mode, firstly, it is determined whether the renewal lamp 24 blinks at a high speed at a time of the previous power supply off (S301). Since the case that the renewal lamp 24 blinks at the high speed means the case that the execution of the automatic or manual emergency renewing mode is required (for example, the case that the clogged state of the DPF 50 is not improved), the step goes back to the main routine of the loop process for changing to the emergency renewing mode in the next step, in the case that the power supply is turned off during the high-speed blinking (S301: YES).

In the case that it does not blink at the high speed (S301: NO), it is determined whether the accumulated drive time Te of the engine 70 is equal to or more than the set time T0 (S302). The set time T0 of the embodiment is set, for example, to about 100 hours. In this case, the set time T0 may be equal to or more than several tens hours. The accumulated drive time Te of the engine 70 is measured by using the time information of the timer 35 in the ECU 11, while the engine 70 is driven, and is stored and accumulated in the EEPROM 33.

If the accumulated drive time Te is equal to or more than the set time T0 (S302: YES), a value of a post injection flag APSTINJ in the automatic auxiliary renewing flag table FT2 is determined (S303). In this case, the post injection means a fuel injection which is carried out after the main injection for feeding the high-pressure fuel to the exhaust gas route. Since the high-pressure fuel fed to the exhaust gas route mainly burns the PM within the DPF 50, the DPF 50 can be renewed. In the second embodiment, since the common rail 120 is provided as the fuel injection device and APSTINJ="1." is established, the step changes to a sub routine of a forced renewing (an initialization renewing) mode shown in FIG. 11 (details of which will be mentioned later).

If the accumulated drive time Te is less than the set time T0 (S302: NO), it is next determined whether the PM deposition amount within the DPF 50 which is estimated from the detection result of the by differential pressure sensor 68 is equal to or more than a prescribed amount (a prescribed level) (S304). The prescribed amount of the embodiment is set, for example, to 8 g/l. If the PM deposition amount is less than the prescribed amount (S304: NO), the step goes back to the main routine of the loop process. If the PM deposition amount is equal to or more than the prescribed amount (S304: YES), measurement on the basis of the time information of the timer 35 is started so as to make the renewal lamp 24 blink at the low speed (S305), and the execution of the renewing motion (the automatic auxiliary renewing mode) of the DPF 50 is advance notified to the operator. In this case, a blinking frequency of the renewal lamp 24 is set, for example, to 1 Hz.

Next, it is determined whether the renewal inhibition button 27 is under pushing (inhibiting) operation (S306), and if it is under pushing operation (S306: ON), the renewal inhibition lamp 28 is turned on (S307). While the renewal inhibition button 27 is under pushing operation, the control mode of the engine 70 stays in the normal drive mode in spite of the fact that the PM deposition amount is equal to or more than the prescribed amount, so that the current drive state in the engine 70 is maintained. In other words, the change to the automatic auxiliary renewing mode (which may be called as the renewing motion of the DPF 50 or the actuation of the renewing device) is inhibited. Further, while the renewal inhibition button 27 is under pushing operation, it is visually appeals to the operator that the fact that the renewing motion of the DPF 50 is inhibited, by turning on the renewal inhibition lamp 28, and securely calls the operator's attention.

Next, it is determined whether a predetermined leaving time (for example, 30 minutes) elapses from starting pushing down the renewal inhibition button 27 (S308). If the leaving time elapses (S308: YES), there is the possibility of the PM excessive deposition. Accordingly, in order to change to the emergency renewing mode in the next step, the step goes back to the main routine in the loop process. If the leaving time does not elapse (S308: NO), the step goes back to the step S305.

In the step S306, if the renewal inhibition button 27 is not under pushing operation (S306: OFF), it is determined whether a predetermined time (for example, 10 seconds) elapses from starting the low-speed blinking of the renewal lamp 24 (S309). If the predetermined time does not elapse (S309: NO), the step goes back to the step S305. If the predetermined time elapses (S309: YES), the renewal inhibition lamp 28 is turned off, and the renewal lamp 24 which blinks at the low speed is turned on (S310), and thereafter the automatic auxiliary renewing process after the step S311 is executed.

In the step S311, a value of an intake air throttle flag INTSLT in the automatic auxiliary renewing flag table FT2 which is read out of the EEPROM 33 is determines. In the second embodiment, since the intake air throttle device 81 is provided and INTSLT="1" is established, the intake air throttle device 81 is closed to a predetermined opening degree so as to restrict an intake air amount to each of the cylinders (S312). Then, a value of an exhaust gas throttle flag OUTSLT is determined (S313). In the second embodiment, since the exhaust gas throttle device 82 is provided and OUTSLT="1" is established, the exhaust gas throttle device 82 is closed to a predetermined opening degree so as to suppress the discharge of the exhaust gas (S314).

Next, a value of a post injection flag APSTINJ is determined (S315). Since APSTINJ="1" is established in the second embodiment, the post injection is executed by the common rail 120 (S316). As mentioned above, in the automatic auxiliary renewing mode, the temperature of the exhaust gas is raised by increasing the engine load by the restriction of the intake air amount and the exhaust gas amount, or the PM within the DPF 50 is directly burnt by the post injection. As a result, the PM within the DPF 50 is removed, and the PM collecting capacity of the DPF 50 (the soot filter 54 is recovered.

Next, it is determined whether the PM deposition amount which is estimated from the detection result of the differential pressure sensor 68 is equal to or less than an allowable amount (an allowable level) (S317). The allowable amount of the embodiment is set, for example, to 4 WI. If the PM deposition amount is equal to or less than the allowable amount (S317: YES), the renewal lamp 24 is turned off so as to inform of the end of the automatic auxiliary renewing mode (S318), and the step goes back to the main routine of the loop process. In the case that the PM deposition amount exceeds the allowable amount (S318: NO), it is a state in which the PM is not sufficiently removed (the clogged state is not improved) in spite of the execution of the automatic auxiliary renewing mode. Accordingly, the step changes to the sub routine of the forced renewing (the initialization renewing) mode shown in FIG. 11 (details of which will be mentioned later).

Figure 11:
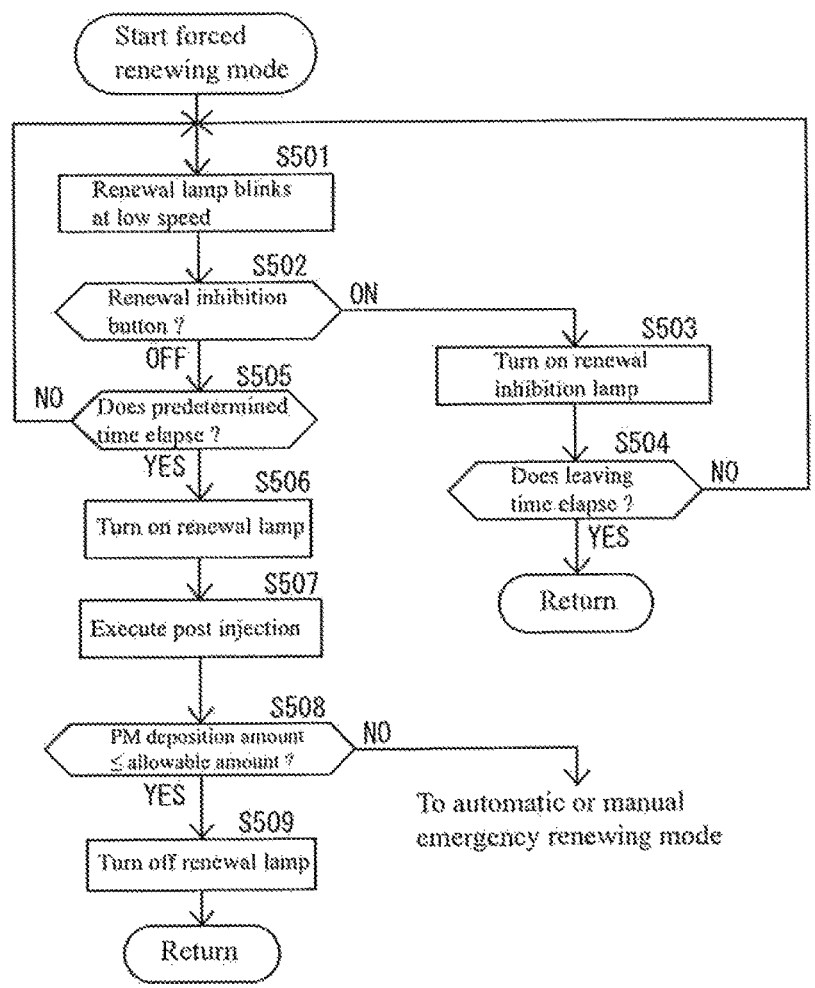
FIG. 11 is a flow chart of a forced renewing (initialization renewing mode.

In the sub routine of the forced renewing (the initialization renewing) mode shown in FIG. 11, measurement on the basis of the time information of the tinier 35 is started so as to make the renewal lamp 24 blink at the low speed (S501), and the execution of the renewing motion (the forced renewing mode) of the DPF 50 is advance notified to the operator. In this case, a blinking frequency of the renewal lamp 24 is set, for example, to 1 Hz in the same manner as the case of the automatic auxiliary renewing mode.

Next, it is determined whether the renewal inhibition button 27 is under pushing operation (S502), and if it is under pushing operation (S502: ON), the renewal inhibition lamp 28 is turned on (S503). While the renewal inhibition button 27 is under pushing operation, the current drive state in the engine 70 is maintained and the execution of the forced renewing mode is inhibited, in spite of the fact that the clogged state of the DPF 50 is not improved.

Next, it is determined whether a predetermined leaving time (for example, 30 minutes) elapses from starting pushing down the renewal inhibition button 27 (S504). If the leaving time elapses (S504: YES), there is the possibility of the PM excessive deposition. Accordingly, in order to change to the emergency renewing mode in the next step, the step goes back to the main routine in the loop process. If the leaving time does not elapse (S504: NO), the step goes back to the step S501.

In the step S502, if the renewal inhibition button 27 is not under pushing operation (S502: OFF), it is determined whether a predetermined time (for example, 10 seconds) elapses from starting the low-speed blinking of the renewal lamp 24 (S505). If the predetermined time does not elapse (S505: NO), the step goes back to the step S501. If the predetermined time elapses (S505: YES), the renewal inhibition lamp 28 is turned off, and the renewal lamp 24 which blinks at the low speed is turned on (S506), and thereafter executes the forced renewing (the initialization renewing) process after the step S507.

In the forced renewing mode, as mentioned above, the temperature of the exhaust gas within the DPF 50 is raised by supplying the high-pressure fuel into the DPF 50 by the post injection E of the common rail system 117 (S507), and burning the high-pressure fuel by the diesel oxidation catalyst 53. As a result, the PM within the DPF 50 is forcibly burnt and removed, and the PM collecting capacity of the DPF 50 is recovered. The forced renewing mode of the embodiment is executed, for example, for about 30 minutes, and the common rail system 117 does not carry out the post injection E after an elapse of the time. In this case, if the forced renewing mode is executed, the accumulated drive time Te of the engine 70 is reset, and is newly measured by using the timer 35.

Next, it is determined whether the PM deposition amount which is estimated from the detection result of the differential pressure sensor 68 is equal to or less than an allowable amount (an allowable level) (S506). If the PM deposition amount is equal to or less than the allowable amount (S508:

YES), the renewal lamp 24 is turned off so as to inform the end of the forced renewing mode (S509), and the step goes back to the main routine of the loop process. In the case that the PM deposition amount exceeds the allowable amount (S508: NO), it is a state in which the PM cannot be sufficiently removed (the clogged state is not improved) even by the forced renewing mode. Accordingly, in order to change to the emergency renewing mode in the next step, the step goes back to the main routine of the loop process.

In this case, after passing through the automatic auxiliary renewing mode and the forced renewing mode, the step goes back to the main routine of the loop process shown in FIG. 7, and determines a value of an emergency renewing flag EMMOD (S15). Since EMMOD="0" is established in this case, the sub routine of the automatic emergency renewing mode shown in FIG. 12 is called, and executes the automatic emergency renewing process (S16).

In the sub routine of the automatic emergency renewing mode, firstly, it is determined whether the PM deposition amount which is estimated from the detection result of the differential pressure sensor 68 is equal to or more than a critical amount (a critical level) (S601). The critical amount in this case is set to a value which is higher than the prescribed amount (refer to S304) mentioned above. The PM deposition amount equal to or more than the critical amount means a state in which the PM is excessively deposited within the DPF 50 and there is the possibility of the PM runaway combustion. If the PM deposition amount is less than the critical amount (S601: NO), the step goes back to the main routine of the loop process. If the PM deposition amount is equal to or more than the critical amount (S601: YES), the renewal lamp 24 blinks at a high speed (S602), and the execution of the renewing motion (the automatic emergency renewing mode) of the DPF 50 is advance notified to the operator. In this case, the blinking frequency of the renewal lamp 24 is set to a frequency which is different from the automatic auxiliary renewing mode and the forced renewing mode. For example, the blinking frequency of the renewal lamp 24 for advance notifying of the automatic emergency renewing mode is set to 2 Hz. In other words, the renewal lamp 24 is actuated according a warning aspect (a high-speed blinking) which is different from an actuation aspect (a low-speed blinking) for promoting the execution of the forced renewing (the initialization renewing) mode.

If a predetermined time (for example, 10 seconds) elapses from starting the high-speed blinking of the renewal lamp 24 (S603: YES), after the renewal lamp 24 which blinks at the high speed is turned on (S604), the automatic emergency renewing process after a step S605 is executed,. In the automatic emergency renewing mode, the high-pressure fuel is supplied into the DPF 50 by the post injection E of the common rail system 117, and the high-pressure fuel is burnt by the diesel oxidation catalyst 53. In addition, the injection state of the fuel to each of the cylinders on the basis of an electronic control of the common rail system 117 is adjusted, and the engine rotating speed N is maintained, at a high idle rotating speed (a maximum rotating speed).

In other words, in the step S605, a value of an intake air throttle flag INTSLT in the automatic auxiliary renewing flag table FT2 is determined, and since INTSLT="1" is established in the second embodiment, the intake air throttle device 81 is closed to a predetermined opening degree so as to restrict the intake air amount to each of the cylinders (S606). Then, a value of an exhaust gas throttle flag OUTSLT is determined (S607). Since OUTSLT="1" is established in the second embodiment, the exhaust gas throttle device 82 is closed to a predetermined opening degree so as to suppress the discharge of the exhaust gas (S608).

Next, a value of a post injection flag ESPTINJ for an emergency renewing is determined (S609), and since EPSTINJ="1" is established in the second embodiment, the post injection is executed by the common rail 120 (S610). Further, the engine rotating speed N is maintained, at the high idle rotating speed (the maximum rotating speed) (S611). As mentioned above, in the automatic auxiliary renewing mode, the engine load is increased by the restriction of the intake air amount and the exhaust gas amount so as to raise the temperature of the exhaust gas, or the PM within the DPF 50 is directly burnt by the post injection. As a result, the PM within the DPF 50 is removed, and the PM collecting capacity of the DPF 50 (the soot filter 54) is recovered.

Accordingly, as well as the temperature of the exhaust gas from the engine 70 is raised, the temperature of the exhaust gas is raised by the post injection E within the DPF 50 (about 600° C.). As a result, the PM within the DPF 50 can be forcibly burnt and removed under condition which is more preferable than the reset renewing mode, and the PM collecting capacity of the DPF 50 can be recovered.

In this case, in the step S611, an injection state (an injection pressure, an injection timing and an injection period) of the fuel to each of the cylinders may be adjusted by an electronic control of the common rail system 117, so as to maintain the rotating speed N in the idling state in the engine 70 higher than a low idle rotating speed (a predetermined low rotating speed). According to the structure mentioned above, since the exhaust gas is easily maintained in a high temperature state, it is possible to reduce an executing frequency of the renewing motion of the DPF 50 or shorten an executing time, whereby it is possible to achieve an efficiency of the renewal of the DPF 50 and to contribute to the suppression of the fuel consumption deterioration. Particularly, it is possible to further promote the efficiency of the renewal of the DPF 50 by maintaining at the high idle rotating speed (the maximum rotating speed). In this case, it is more preferable that the instrument panel is provided with rotating speed setting means, for example, a dial type or the like, and the maintained rotating speed can be changed depending on the operation position of the rotating speed setting means.

The automatic emergency renewing mode of the embodiment is executed, for example, for about 15 minutes, and after the time elapses (S612: YES), the common rail system 117 does not carry out the post injection E, adjusts the injection state of the fuel to each of the cylinders, and returns the rotating speed N of the engine 70 to the original rotating speed before being fixed to the high idle.

After the predetermined time elapses in the step S612, it is determined whether the temperature TP of the exhaust gas within the DPF 50 which is detected by the DPF temperature sensor 26 is equal to or less than a lower limit temperature TP0 (S613). If the temperature TP of the exhaust gas within the DPF 50 exceeds the lower limit temperature TP0 (S613: NO), the step changes to a step S615 so as to turn off the renewal lamp 24, the end of the automatic emergency renewing mode is informed, and the step goes back to the main routine of the loop process.

If the temperature TP of the exhaust gas within the DPF 50 is equal to or less than the lower limit temperature TP0 (S613: YES), it is in the PM excessive deposition state in which the temperature of the exhaust gas is not raised and the clogged state of the MT 50 is not improved, in spite of the execution of the automatic emergency renewing mode.

In this case, since there is the possibility of the PM runaway combustion, the limp home flag LF is set (LF=1, S614), the limp home process is made to be executable, the renewal lamp 24 is turns off, the end of the automatic emergency renewing mode is informed, and the step goes back to the main routine of the loop process.

After the execution of the automatic emergency renewing mode, the step goes back to the main routine of the loop process shown in FIG. 7, and a sub routine of the limp home mode is called shown in FIG. 14 so as to execute the limp home process (S18). In the sub routine of the limp home mode, it is determined whether the limp home flag LF is set (S801), and if the limp home flag LF is in a reset state (S801: NO), the step goes back to the main routine of the loop process.

If the limp home flag LF is in the set state (S801: YES), the engine 70 is held in a minimum drive state by restricting upper limit values Nlt and Tlt of the outputs (the rotating speed N and the torque T) of the engine 70, and a drivable time Tilt of the engine 70 (S802). As a result, it is possible to secure a minimum traveling function in the working machine. Thereafter, the step goes back to the main routine of the loop process.

In this case, the limp home flag LF corresponds to the fact whether the limp home mode has been executed in the past, and is not reset until using an external tool (for example, existing in a dealership) which is connected to the ECU 11 via a communication terminal, line. Therefore, once the limp home mode is executed, the mode cannot be returned to the other mode until inspecting and maintaining in a dealership or a service center so as to reset the limp home flag LF.

Further, the limp home mode is set such that in the case that the current rotating speed N and torque T in the engine 70 are greater than the upper limit values Nlt and Tlt, the rotating speed N and the torque T of the engine 70 are lowered little by little to the upper limit values Nlt and Tlt. Accordingly, a problem that the operator cannot deal with the change so as to cause an engine stall is avoided by preventing the rotating speed N and the torque T from rapidly changing (lowering) and doing away with an uncomfortable feeling of the operator at a time of the execution of the limp home mode, in the case that the mode is changed to the limp home mode.

After passing through the limp home mode, the step goes back to the main routine of the loop process shown in FIG. 7, and a value of a mode selection flag RGMOD is determined (S19). In this case, since RGMOD="1" is established, a sub routine shown in FIG. 16B is called, and a second failure diagnosis process is executed (S21). In the second failure diagnosis process, a value of the intake air throttle flag INTSLT is determined (S1001). Since INTSLT="1" is established in this case, a failure diagnosis of the intake air throttle device 81 is executed (S1002). Next, a value of the exhaust gas throttle flag OUTSLT is determined (S1003), and since OUTSLT="1" is established in this case, a failure diagnosis of the intake air throttle device 81 is executed (S1004). In the failure diagnosis of each of the throttle devices 81 and 82, for example, the throttle devices 81 and 82 are actuated so as to open and close, and checked on the basis of the detection result whether the actuating state is normal. Thereafter, the step goes back to the main routine of the loop process so as to be completed.

(6) Third Embodiment of Loop Process

Figure 13:
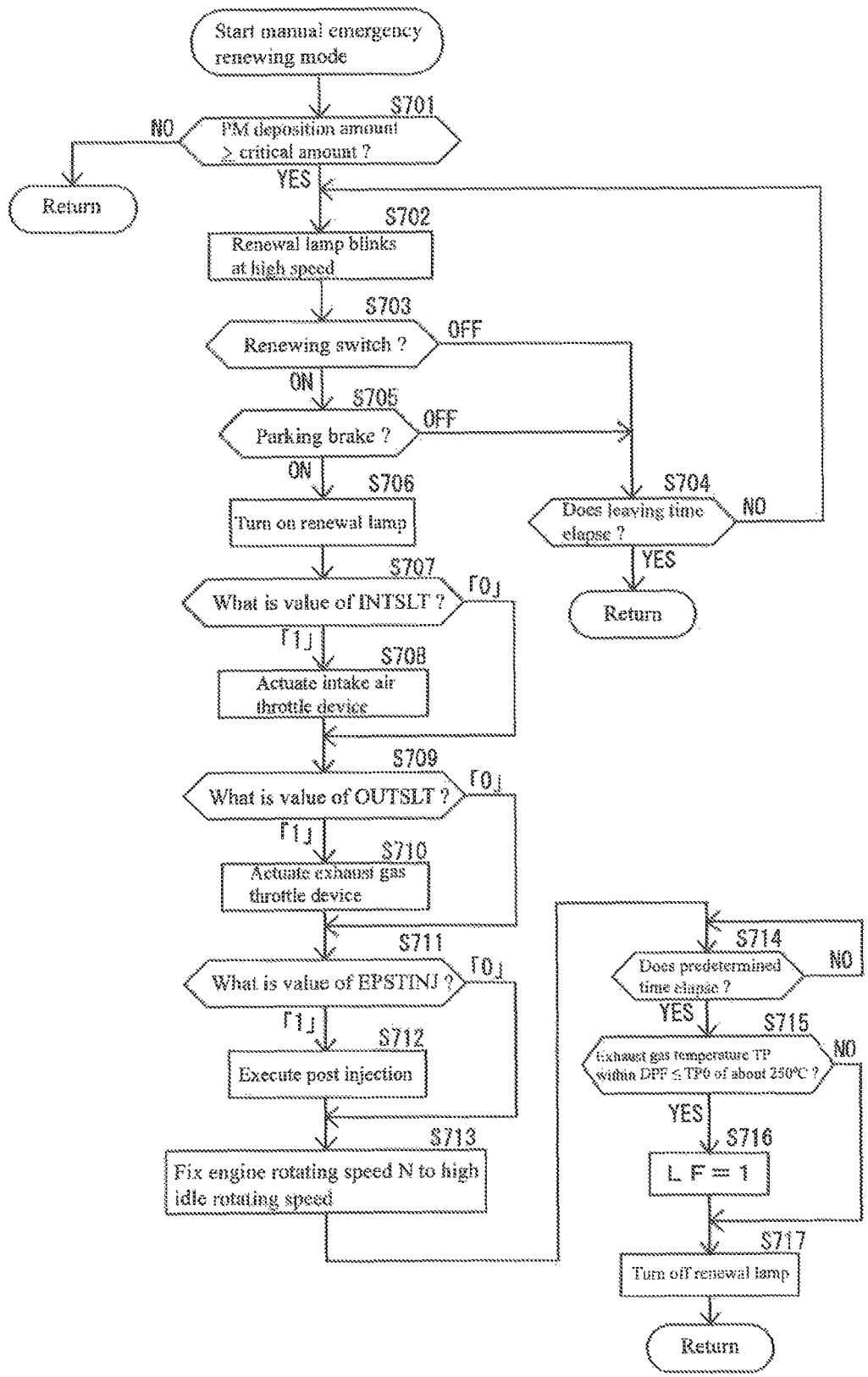
FIG. 13 is a flow chart of a manual emergency renewing mode.

Next, a description will be given of the third embodiment of the loop process of the DPF renewing control by the ECU 11 with reference to the flow charts in FIG. 7, FIG. 10 and FIG. 13, and the transition view in FIG. 18. The third embodiment shows the case that the engine 70 is mounted to a working machine (for example, the hydraulic shovel) of a type which executes the manual auxiliary renewing mode. In the manual auxiliary renewing mode, since the renewal of the DPF 50 is allowed by the turn-on operation of the renewing switch 21, the engine device of the third embodiment is provided with the renewing switch 21 in addition to the intake air and exhaust gas throttle devices 81 and 82.

Figure 10:
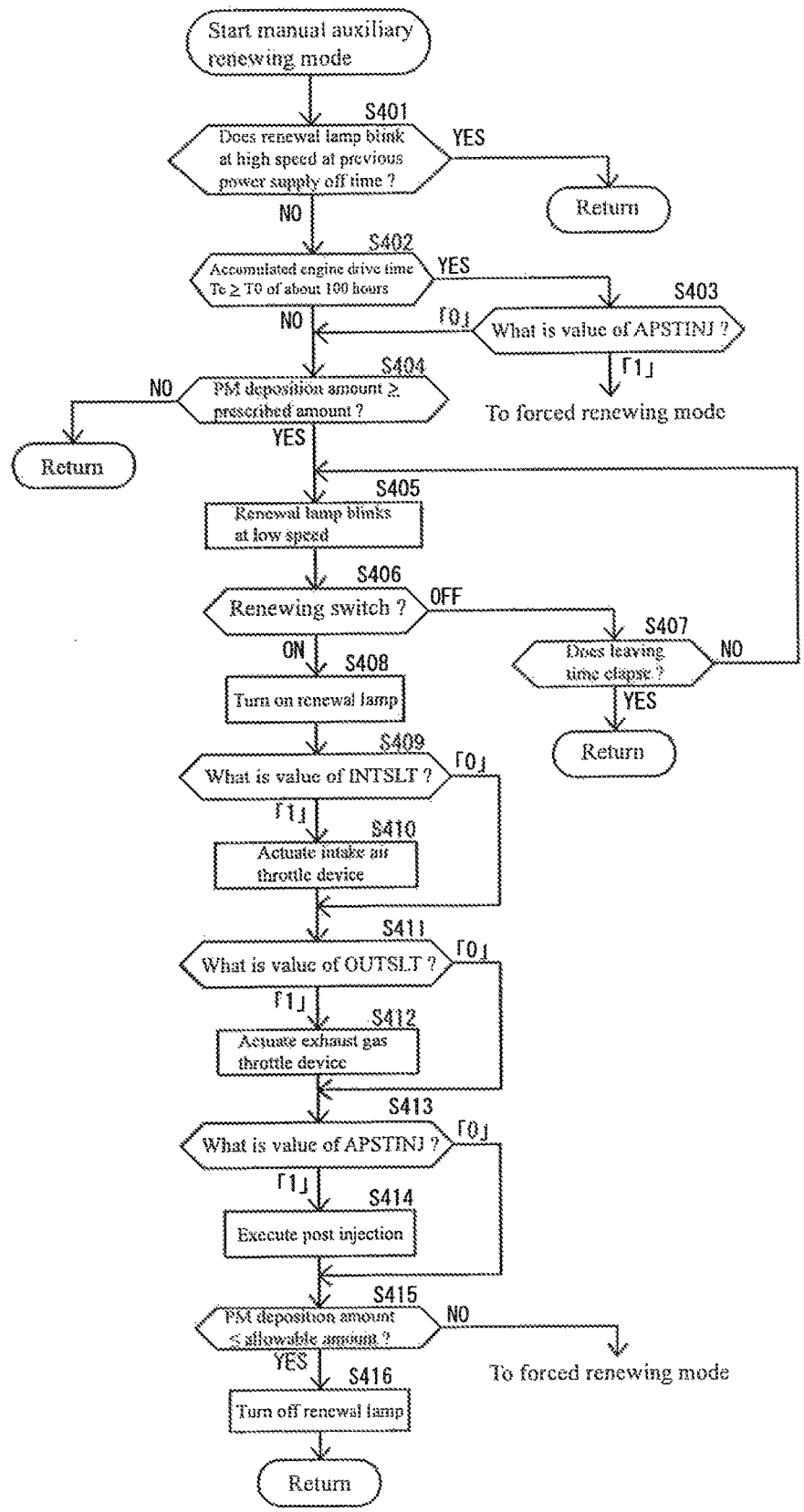
FIG. 10 is a flow chart of a manual auxiliary renewing mode.

In the loop process of the third embodiment shown in FIG. 7, since RGMOD="2" is established at a time of determining a value of the mode selection flag RGMOD (S11), the sub routine of the manual auxiliary renewing mode shown in FIG. 10 is called, and the manual auxiliary renewing process is executed (S14). In the sub routine of the manual auxiliary renewing mode, since a flow of steps S401 to S405 is the same as the flow of the steps S301 to S305 of the automatic auxiliary renewing mode described in the second embodiment, a detailed description thereof will be omitted.

After the step S405, it is determined whether a renewing switch 21 is in an on state (S406), and if it is in an off state (S406: OFF), it is determined whether a predetermined leaving time (for example, 30 minutes) elapses from the start of the low-speed blinking of the renewal lamp 24 (S407). If the leaving time elapses (S407: YES), there is the possibility of the PM excessive deposition. Accordingly, in order to change to the emergency renewing mode in the next step, the step goes back to the main routine of the loop process. If the leaving time does not elapse (S407: NO), the step goes back to the step S405. If the renewing switch 21 is in the on state in the step S406, the step the renewal lamp 24 which blinks at the low speed is turned on (S408), and a manual auxiliary renewing process after a step S409 is executed. Since the flow of the steps S409 to S416 is the same as the flow of the steps S311 to S319 of the automatic auxiliary renewing mode described in the second embodiment, a detailed description thereof will be omitted.

After passing through the manual auxiliary renewing mode or the forced renewing mode, the step goes back to the main routine of the loop process shown in FIG. 7, and a value of the emergency renewing flag EMMOD is determined (S15). Since EMMOD="1" is established in this case, a sub routine of the manual emergency renewing mode shown in FIG. 13 is called, and a manual emergency renewing process is executed (S17).

In the sub routine of the manual emergency renewing mode, a flow of steps S701 and S702 is the same as the flow of the steps S601 and S602 of the automatic emergency renewing mode described in the second embodiment. After the step S702, it is determined whether both the renewing switch 21 and the parking brake operating means 29 are in an on state (S703 and S705). This intends to inhibit the mode from changing to the manual emergency renewing mode until the operator intentionally stops the traveling and the various works of the working machine, since engine rotating speed N is widely increased in the manual emergency renewing mode.

If one or both of the renewing switch 21 and the parking brake operating means 29 is in an off state (S703: OFF, S705: OFF), it is determined whether a predetermined leaving time (for example, 30 minutes) elapses from starting the high-speed blinking of the renewal lamp 24 (S704). If the leaving time elapses (S704: YES), there is the possibility of the PM excessive deposition. Accordingly, in order to change to the limp home mode in the next step, the step goes back to the main routine of the loop process. If the leaving time does not elapse (S704: NO), the step goes back to the step S702.

If both of the renewing switch 21 and the parking brake operating means 29 are in the on state (S703: YES, S705: YES), the renewal lamp 24 which blinks at the high speed is turned on (S706), and thereafter the manual emergency renewing process after the step S707 is executed. A flow of the steps S707 to S717 is the same as the flow of the step S605 to S615 of the automatic emergency renewing mode described in the second embodiment. In this case, the on-off state of only the renewing switch 21 may be determined, or the on-off state of only the parking brake operating means 29 may be determined. In this case, on the basis of the operation of both the renewing switch 21 and the parking brake operating means 29, a higher effect can be achieved as an interlock structure (a glitch preventing structure) with respect to the execution of the manual emergency renewing mode. After the execution of the manual emergency renewing mode, the limp home process and the second failure diagnosis process are executed in the same manner as the second embodiment.

(7) Interrupt Processing to Limp Home Mode

Figure 15:
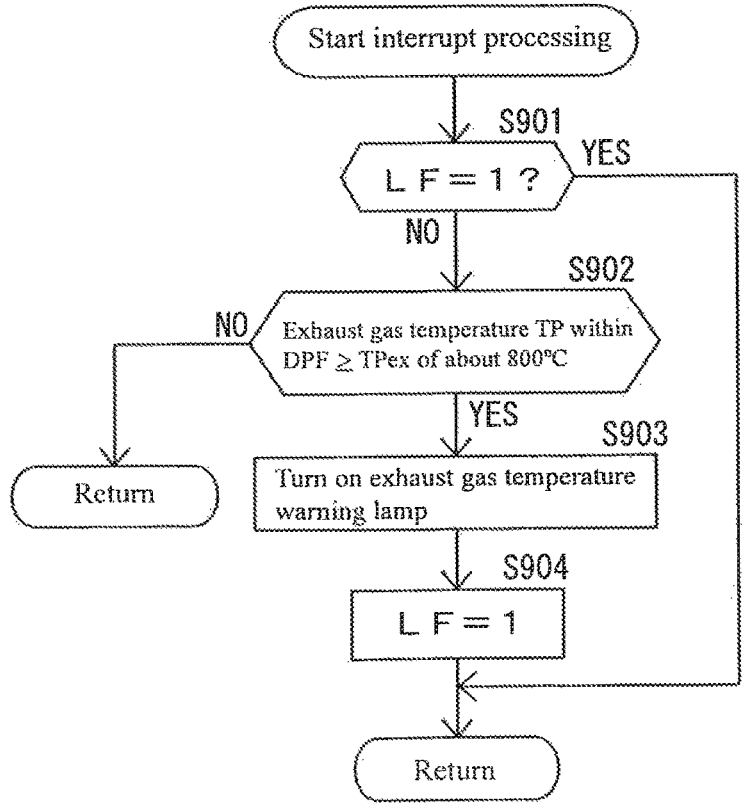
FIG. 15 is a flow chart showing an interrupt handling.
Figure 16:
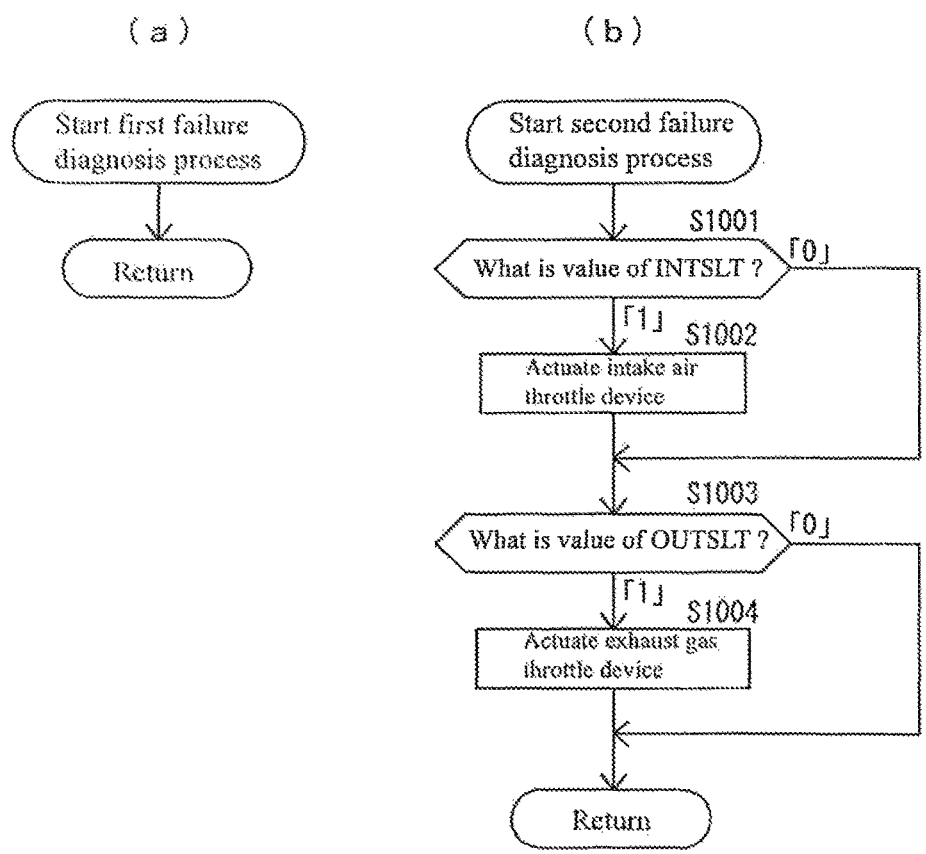
FIGS. 16A and 16B are flow charts of a failure diagnosis process, in which FIG. 16A corresponds to the self-renewing mode, and FIG. 16B corresponds to the automatic and manual auxiliary renewing modes.
Figure 17:
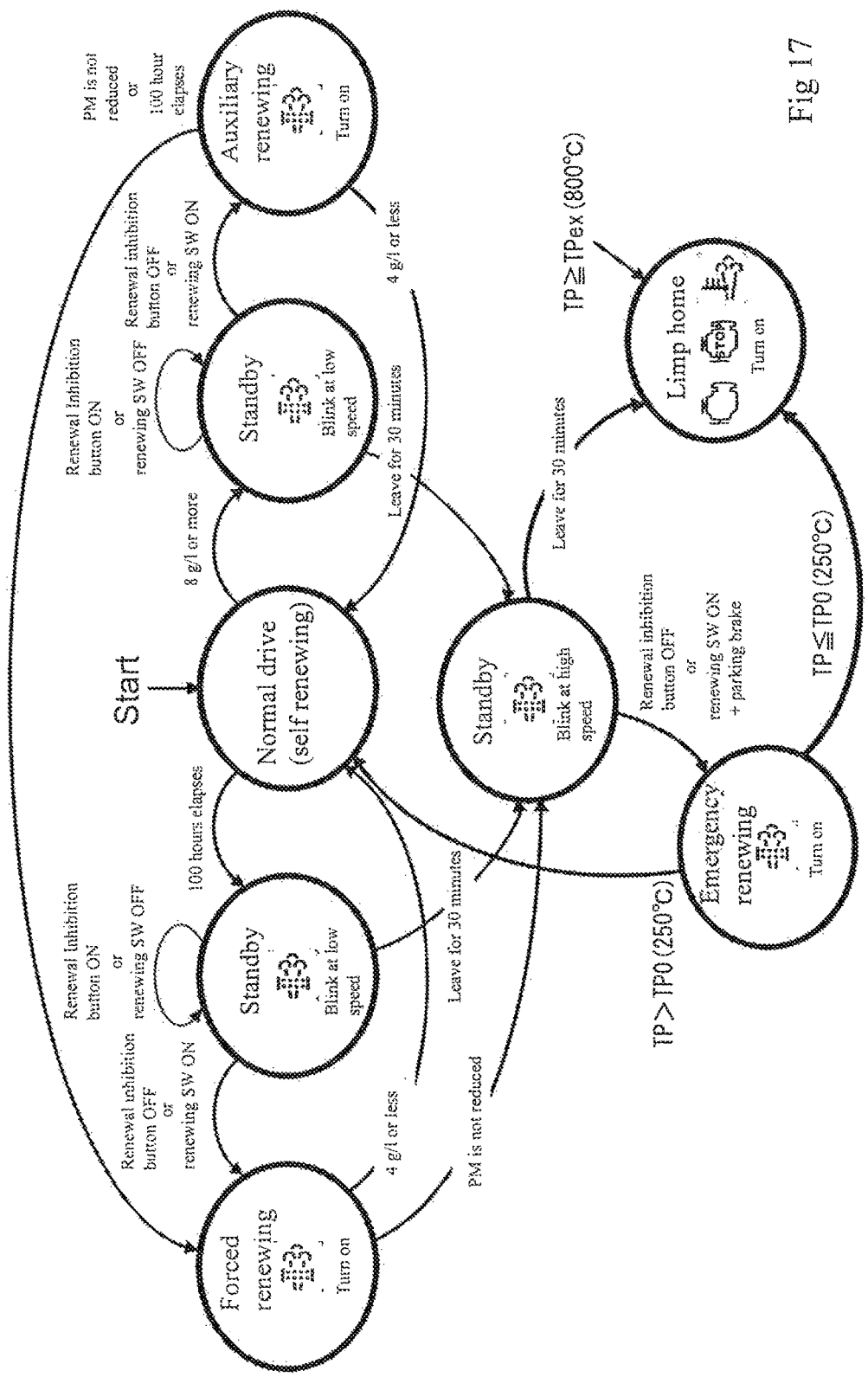
FIG. 17 is an explanatory view of a transition relationship of the renewing modes.

In this case, the ECU 11 of the embodiment is structured such that an interrupt processing shown in FIG. 15 is executed under execution of the renewing control of the DPF 50. In the interrupt processing, the detected result of the DPF temperature sensor 26 is checked at appropriate time intervals. In this case, as shown by a flow chart in FIG. 15, it is determined whether the limp home flag LF is reset (S901). If the limp home flag LF is in the set state (S901: YES), the step goes to the main routine of the loop process, and the limp home mode is executed because it is not possible to return to the other mode from the limp home mode.

If the limp home flag LF is in the reset state (S901: YES), it is determined whether the temperature TP of the exhaust gas within the DPF 50 which is detected by the DPF temperature sensor 26 exceeds a previously set abnormal temperature TPex (S902) in the case that the temperature TP exceeds the abnormal temperature TPex (S902: YES) the exhaust gas temperature warning lamp 23 is turned on (S903), and thereafter sets the limp home flag LF is set (S904). Further, the step goes to the main routine of the loop process so as to execute the limp home mode. The abnormal temperature TPex of the embodiment is set to, for example, about 800° C. The state in which the temperature TP of the exhaust gas within the DPF 50 exceeds the abnormal temperature TPex can be understood as the runaway combustion of the excessively deposited PM. In this case, there is a risk that the DPF 50 is broken (melt-away), and an excessive emission (air contaminant) is discharged. Accordingly, the step is quickly changed to the limp home mode.

In this case, it is possible to employ an interrupt processing which determines on the basis of the detected result of the differential pressure sensor 68 whether an abnormally differential pressure is generated and changes to the limp home mode in the case that the abnormally differential pressure is generated. The case that the abnormally differential pressure is generated can be understood as the PM excessively deposited state in which the possibility of the PM runaway combustion is concerned. In this case, it is desirable to quickly change to the limp home mode.

(8) Summary

As is apparent from the above description and FIG. 1 to FIG. 7 and FIG. 18, since the engine device includes the exhaust gas purification device 50 which is arranged in the exhaust gas route 77 of the engine 70, and the ECU 11 which controls the drive of the engine 70, the engine device is provided with the rewritable memory means 33 storing the general-purpose renewing program GPM which selectively executes any one of a plurality of renewing modes with respect to the exhaust gas purification device 50, and the flag tables FT which correspond to the optional renewing modes, and the ECU 11 executes the general-purpose renewing program GPM in the renewing mode which is selected on the basis of the flag table FT, it is possible to deal with the renewing modes which are different per the kind of the working machine, only by changing the flag table FT in one kind of the general-purpose renewing program GPM. Accordingly, there can be achieved an effect that it is possible to make the ECU 11 common use (common specification) with respect to great variety of working machines. In other words, there can be achieved an effect that it is possible to achieve both an advantage that a general-purpose property of the ECU 11 is improved, and an advantage that compatibility with each of the renewing modes of the ECU 11 is secured.

Further, there is an advantage that it is not necessary to develop the renewing program of the exhaust gas purification device 50 by the kind of the various working machines, thereby contributing to cost reduction. Further, since it is possible to easily switch the general-purpose renewing program GPM to the corresponding one by the kind of the working machine, only by changing the flag table FT, without any special knowledge of the programming, it becomes easy to provide the engine device to meet the requirements of the customer (the engine purchasing manufacturer).

As is apparent from the above description, FIG. 1 to FIG. 6 and FIG. 18, since the fixed memory means 32 which previously and fixedly stores the flag table FT is provided, and the flag table FT stored in the fixed memory means 32 is written in the variable memory means 33 at the first access time of the fixed memory means 32 and the variable memory means 33, it is possible to easily execute the DPF renewing control in the renewing mode which is different from the initial setting, by later rewriting the flag table FT which is stored in the variable memory means 33. Therefore, it is not necessary to delete the flag table FT, for example, each time the fixed memory means 3 is replaced, or rewrite the general-purpose renewing program GPM, in the case that it is intended, to change the renewing mode, and there can be achieved an effect that it is easy to deal with the systems of the various working machines. For example, for the customer, it is easy to modify to a setting which is suitable for its own specification in spite of the engine 70 which is purchased from outside.

As is apparent from the above description and FIG. 1 to FIG. 18, since a plurality of renewing modes include at least the self-renewing mode which drives the engine 70 under the condition that the exhaust gas purification device 50 can be renewed, the automatic auxiliary renewing mode which automatically raises the temperature of the exhaust gas in the case that the clogged degree of the exhaust gas purification device 50 exceeds the prescribed level, and the manual auxiliary renewing mode which allows the renewal of the exhaust gas purification device 50 on the basis of the turn-on operation of the manual operating means 24, it is possible to deal with a plurality of renewing modes which are suitable for the various types of working machines by the system of one kind of engine device. Therefore, there is achieved an effect that it is possible to further improve a customer satisfaction.

As is apparent from the above description, FIG. 1 to FIG. 16 and FIG. 18, since necessity of the failure diagnosis of the engine auxiliary machines 81 and 82 which are relevant to the renewal of the exhaust gas purification device 50 is selected in correspondence to the flag table FT, at a time of executing the general-purpose renewing program GPM, it is possible to execute the failure diagnosis of the engine auxiliary machines 81 and 82 in case of necessity and omit the failure diagnosis of the engine auxiliary machines 81 and 82 in unnecessary case, only by one kind of the general-purpose renewing program GPM, even if with or without the engine auxiliary machines 81 and 82 is changed on the basis of the difference of the renewing mode. In other words, there is achieved an effect that it is possible to easily switch the execution and the omission of the failure diagnosis depending on with or without the engine auxiliary machines 81 and 82, without carrying out a delicate setting operation.

As is apparent from the above description and FIG. 1 to FIG. 18, since the exhaust gas purification device 50 which is arranged in the exhaust gas route 77 of the engine 70, the renewing devices 70, 81, 82 and 117 for burning and removing the particulate matter within the exhaust gas purification device 50, the renewal advance notifying means 24 which is actuated in the case that the clogged state of the exhaust gas purification device 50 becomes equal to or more than the prescribed level, and the renewal informing means 24 which informs of the matter that the renewing devices 70, 81, 82 and 117 are under operation are provided, and it is structured such that the renewal advance notifying means 24 is actuated before actuating the renewing devices 70, 81, 82 and 117, the operator can previously assume the shock of fluctuation of the torque T and the change of sound of the engine 70 which are generated thereafter, by the renewal advance notification. Further, by the renewal information, the operator can easily comprehend the change to the renewing motion of the exhaust gas purification device 50. Therefore, it is possible to achieve the effect that the uncomfortable feeling of the operator caused by the renewing motion of the exhaust gas purification device 50 can be done away. For example, it is possible to compensate a defect in the renewing motion of the exhaust gas purification device 50 which may obstruct the careful work which the operator executes on the basis of the sound of the engine 70.

As is apparent from the above description and FIG. 1 to FIG. 18, since the renewal advance notifying means 24 and the renewal informing means 24 are constructed by the single display device 24, and are structured such as to display the renewal advance notification and the renewal information on the basis of the different aspects, it is possible to recognize the renewal advance notification and the renewal information distinctly from each other by the different aspects despite using the single display device. Accordingly, it is possible to achieve an effect that the operator easily comprehends with or without the renewing motion of the exhaust gas purification device 50. In addition, it is not necessary to provide the renewal advance notifying means 24 and the renewal informing means 24 individually, and it is possible to contribute to a cost reduction of this kind of display device 24.

As is apparent from the above description and FIG. 1 to FIG. 18, since the renewal inhibition input means 27 which inhibits the renewing motion of the exhaust gas purification device 50 is provided, and it is structured such as to prevent the renewing devices 70, 81, 82 and 117 from being actuated (inhibit the renewing motion of the exhaust gas purification device 50) under inhibiting operation of the renewal inhibition input means 27, regardless of the clogged state of the exhaust gas purification device 50, it is possible to inhibit the renewing motion of the exhaust gas purification device 50 on the basis of the intention of the operator depending on the state of the working machine to which the engine 70 is mounted. Accordingly, through the renewing control for recovering the particulate matter collecting capacity of the exhaust gas purification device 50 can be automatically executed, there can be achieved an effect to smoothly carry out the careful work which the operator executes on the basis of the sound of the engine 70. In other words, it is possible to do away with the defect in the renewing motion of the exhaust gas purification device 50 which may obstruct the careful work.

As is apparent from the above description and FIG. 1 to FIG. 18, since the renewal inhibition informing means 28 which is actuated under inhibiting operation of the renewal inhibition input means 27 is provided, it is possible to visually appeal to the operator the fact that the renewing motion of the exhaust gas purification device 50 is inhibited, by the information of the renewal inhibition informing means 28, while the renewal inhibition input means 27 is operated to inhibit, and it is possible to securely call the operator's attention. There is an advantage that it is possible to easily confirm whether the renewal is under inhibition, by checking the state of the renewal inhibition informing means 28.

As is apparent from the above description and FIG. 1 to FIG. 18, since the exhaust gas purification device 50 which is arranged in the exhaust gas route 77 of the common rail type engine 70, and the renewing devices 70, 81, 82 and 117 for burning and removing the particulate matter within the exhaust gas purification device 50 are provided, and it is structured such as to execute the emergency renewing mode which supplies the fuel into the exhaust gas purification device 50 by the post injection E and maintains the rotating speed N of the engine 70 at the predetermined value (the high-idle rotating speed), in the case that the clogged state of the exhaust gas purification device 50 is not improved even by executing the reset renewing mode which supplies the fuel into the exhaust gas purification device 50 by the post injection E, it is possible to prevent the particulate matter within the exhaust gas purification device 50 from increasing to the excessively deposited state which may cause the runaway combustion, and it is possible to inhibit the runaway combustion of the particulate matter from being generated within the exhaust gas purification device 50. Therefore, it is possible to prevent a malfunction of the exhaust gas purification device 50 and the engine 70 which is caused by the excessive deposition of the particulate matter.

As is apparent from the above description and FIG. 1 to FIG. 1.8, since the renewal advance notifying means 24 which is actuated in the case that the clogged state of the exhaust gas purification device 50 becomes equal to or more than the prescribed level, and the renewal admittance input means 21 which allows the actuation of the renewing devices 70, 81, 82 and 117 are provided, and it is structured such that the renewal advance notifying means 24 is actuated in the case that the clogged state of the exhaust gas purification device 50 is not improved even by executing the reset renewing mode, and the emergency renewing mode is executed in the case that the allowing operation of the renewal admittance input means 21 is carried out under operation of the renewal advance notifying means 24, the emergency renewing mode is not executed without intention of the operator. Accordingly, in the emergency renewing mode in which the rotating speed N of the engine widely rises, the operator can previously assume the shock due to the fluctuation of the torque T and the change of the sound of the engine 70.

Therefore, it is possible to avoid an unexpected occurrence, for example, a rapid acceleration of the working machine to which the engine is mounted. Therefore, it is possible to avoid an unexpected occurrence, for example, a rapid acceleration of the working machine to which the engine is mounted.

As is apparent from the above description and FIG. 1 to FIG. 18, since the parking brake operating means 29 which maintains the working machine mounted with the engine 70 in the braked state is provided, and it is structured such that the emergency renewing mode is not executed regardless of the clogged state of the exhaust gas purification device 50 and the operating state of the renewal admittance input means 21, in the case that the braking operation of the parking brake operating means 29 is not carried out, it is possible to inhibit the mode from changing to the emergency renewing mode until the operator intentionally stops the traveling and the various works of the working machine. Accordingly, in the emergency renewing mode in which the rotating speed N of the engine 70 is widely increased, it is possible to securely avoid an unexpected occurrence, for example, a rapid acceleration of the working machine. In other words, a higher effect can be achieved, as an interlock structure (a glitch preventing structure) with respect to the execution of the emergency renewing mode.

As is apparent from the above description and FIG. 1 to FIG. 18, since it is structured such as to return to the normal drive mode in the case that the clogged state of the exhaust gas purification device 50 is improved after the execution of the emergency renewing mode, it is not necessary for the operator to carry out the returning operation, for example, for changing the mode. Therefore, it is possible to save the labor hour, and lighten the operation load of the operator.

As is apparent from the above description and FIG. 1 to FIG. 18, since the exhaust gas purification device 50 which is arranged in the exhaust gas route 77 of the engine 70 and it is structured such as to execute the limp home mode which restricts the upper limit threshold values Nlt and Tlt of the rotating speed N and the torque T of the engine 70, and the drivable time Tilt of the engine 70 in the case that the temperature TP of the exhaust gas within the exhaust gas purification device 50 becomes equal to or more than the abnormal temperature TPex, the engine 70 is held in the minimum drive state by executing the limp home mode in a state in which the runaway combustion of the particulate matter seems to be generated within the exhaust gas purification device 50. In other words, it is possible to secure the minimum traveling function for the working machine to which the engine is mounted. Therefore, it is possible to get out the working machine, for example, from the work area or move the working machine to a dealership or a service center, and evacuate the working machine to the safety area while preventing breakage (melt-away) of the exhaust gas purification device 50 and an excessive emission discharge.

As is apparent from the above description and FIG. 1 to FIG. 18, since it is structured such that the mode cannot be changed to the other modes than the limp home mode after the execution of the limp home mode, even by restarting the engine 70, the exhaust gas purification device 50 is more likely to be damaged once the limp home mode is executed. It is necessary to carry out the inspection and maintenance, for example, in the dealership or the service center. Accordingly, there is an advantage that it is possible to avoid fear that the exhaust gas purification device 50 is used in the damaged state, and to prevent the excessive emission discharge.

As is apparent from the above description and FIG. 1 to FIG. 18, since it is structured such that the rotating speed N and the torque T of the engine 70 are lowered little by little to the upper limit threshold values Nlt and Tlt in the case that the current rotating speed N and torque T in the engine 70 are larger than the upper limit threshold values Nmx and Tmx, under execution of the limp home mode, it is possible to prevent the rotating speed N and the torque T from being changed (lowered) in the case of the change to the limp home mode. Accordingly, there can be achieved an effect to do away with the uncomfortable feeling of the operator at the time of the execution of the limp home mode and to avoid the problem that the operator cannot deal so as to cause the engine stall.

As is apparent from the above description and FIG. 1 to FIG. 18, since the abnormally high temperature informing means 23 which is actuated in the case that the temperature TP of the exhaust gas within the exhaust gas purification device 50 is equal to or more than the abnormal temperature TPex is provided, it is possible to inform the operator of the exhaust gas temperature abnormality (the runaway combustion), by the information of the abnormally high temperature informing means 23, and it is possible to achieve the effect which is a help of preventing the damage such as the melt-away of the exhaust gas purification device 50 from being expanded.

As is apparent from the above description, FIG. 1 and FIG. 6, since the structure is provided with the exhaust gas purification device 50 which is arranged in the exhaust gas route 77 of the common rail type engine 70, and at least one of the intake air throttle device 81 and the exhaust gas throttle device 82 which are arranged in the intake air and exhaust gas systems 76 and 77 of the engine 70, and it is structured such that in the case that the clogged state of the exhaust gas purification device 50 becomes equal to or more than the prescribed level, the auxiliary renewing mode which raises the temperature of the exhaust gas from the engine 70 by actuating at least one of the intake air throttle device 81 and the exhaust gas throttle device 82 is executed, and in the case that the clogged state of the exhaust gas purification device 50 is not improved even by executing the auxiliary renewing mode, the forced renewing (the initialization renewing) mode which supplies the fuel into the exhaust gas purification device 50 by the post injection E is executed, the temperature of the exhaust gas from the engine 70 is raised by increasing the output of the engine 70, by the restriction of the intake air amount or the exhaust gas amount using at least one of the intake air throttle device 81 and the exhaust gas throttle device 82, in the case that the clogging is generated in the exhaust gas purification device 50 under the normal drive condition. Further, in the case that the clogged state of the exhaust gas purification device 50 is not improved even by executing the auxiliary renewing mode, the temperature of the exhaust gas within the exhaust gas purification device 50 is raised by supplying the fuel into the exhaust gas purification device 50 by the post injection E so as to burn.

In other words, since the temperature of the exhaust gas from the engine 70 is raised in the auxiliary renewing mode, and the temperature of the exhaust gas within the exhaust gas purification device 50 is locally raised in the forced renewing mode, it is possible to forcibly and efficiently burn and remove the particulate matter within the exhaust gas purification device 50 in the forced renewing mode, in comparison with the case of the auxiliary renewing mode. In addition, since the auxiliary renewing mode is executed in the case that the clogging is generated in the exhaust gas purification device 50 under the normal drive condition, it is possible to lower an execution frequency of the forced renewing mode, that is, an execution frequency of the post injection E. Accordingly, there is achieved an effect that it is possible to suppress a fuel consumption deterioration, and it is possible to suppress a durability deterioration of the engine 70 caused by an engine oil dilution.

As is apparent from the above description and FIG. 1 to FIG. 18, since it is structured such that the mode is changed to the forced renewing mode regardless of the clogged state of the exhaust gas purification device 50, as long as the accumulated drive time Te of the engine 70 is equal to or more than the previously set time T0, it is possible to lower the execution frequency of the forced renewing mode, that is, the execution frequency of the post injection E. Accordingly, there is achieved an effect that it is possible to suppress the fuel, consumption deterioration and to suppress the durability deterioration of the engine 70 caused by the engine oil dilution. Further, in the case that the deposition amount of the particulate matter is estimated, for example, by using the differential pressure within the exhaust gas purification device 50, it is possible to reset a displacement of the accumulated deposition amount (the estimated amount) per the set time T0, by executing the forced renewing mode. Therefore, there is an advantage that it is possible to secure a reliability of the control relating to the renewal of the exhaust gas purification device 50.

As is apparent from the above description and FIG. 1 to FIG. 18, since it is structured such that measurement is newly started by resetting the accumulated drive time Te of The engine 70, after the execution of the forced renewing mode, there is achieved an effect that it is not necessary for the operator to carry out the resetting operation, for example, of the accumulated drive time Te and to omit a labor hour for the operator's control so as to smoothly execute the forced renewing mode per the set time T0.

As is apparent from the above description and FIG. 1 to FIG. 18, since the exhaust gas purification system is provided with the exhaust gas purification device 50 which is arranged in the exhaust gas route 77 of the common rail type engine 70, and is structured such that a plurality of renewing modes which burn and remove the particulate matter deposited within the exhaust gas purification device 50 is executed, and the exhaust gas purification system has the initialization renewing (the forced renewing) mode which supplies the fuel into the exhaust gas purification device 50 by the post injection E, regardless of the clogged state of the exhaust gas purification device 50 if the accumulated drive time Te of the engine 70 becomes equal to or more than the previously set time T0 as one of a plurality of renewing modes, it is possible to forcibly and efficiently burn and remove the particulate matter within the exhaust gas purification device 50 by executing the initialization renewing (the forced renewing) mode without any operator's setting operation, in the case that the engine 70 is accumulatively driven for a long time. In other words, it is possible to lower the execution frequency of the forced renewing mode, that is, the execution frequency of the post injection E. Therefore, there can be achieved an effect that it is possible to suppress the fuel consumption deterioration and to suppress the durability deterioration of the engine 70 caused by the engine oil dilution, in spite of the fact that it is possible to efficiently initialize and renew the exhaust gas purification device 50.

As is apparent from the above description and FIG. 1 to FIG. 18, since the exhaust gas purification system includes the renewal advance notifying means 24 which calls attention for promoting execution of each of the renewing modes, and the renewal admittance input means 21 which allows the execution of each of the renewing modes, and the exhaust gas purification system is structured such that in the case that the renewal admittance input means 21 is in the non-operated state under operation of the renewal advance notifying means 24, the initialization renewing mode is not executed, it is possible to inhibit the execution of the initialization renewing mode, that is, the renewing motion of the exhaust gas purification device 50, on the basis of the intention of the operator depending on the state of the working machine to which the engine is mounted. Therefore, the initialization renewing mode is not executed in a state which the operator does not expect at all, and there can be achieved the effect that it is possible to smoothly carry out the careful work which the operator executes on the basis of the engine sound. In other words, it is possible to do away with the defect of the renewing motion of the exhaust gas purification device 50 which may obstruct the careful work.

As is apparent from the above description and FIG. 1 to FIG. 18, since the exhaust gas purification system is structured such that in that case that the non-operated state of the renewal admittance input means 21 carries on for the predetermined leaving time or more, the renewal advance notifying means 24 is actuated by the warning aspect which is different from the operating aspect which promotes the execution of the initialization renewing mode, it is possible to call the operator's attention on the basis of the warning aspect which is different from the operating aspect which promotes the execution of the initialization renewing mode, in the case that the exhaust gas purification device 50 is left for a long time as it is in the state in which the renewal thereof is necessary, and the particulate matter within the exhaust gas purification device 50 is more likely to increase to the excessively deposited state. Accordingly, it is possible to prevent the excessive deposition of the particulate matter (further the runaway combustion).

As is apparent from the above description and FIG. 1 to FIG. 18, since the exhaust gas purification system is structured such that in the case that the power supply is shut off under operation of the renewal advance notifying means 24 in the warning aspect, the operation the renewal advance notifying means 24 is restarted in the warning aspect after restoring the power supply (refer to the step S301 in FIG. 9 and the step S401 in FIG. 10), it is possible to securely avoid the risk that the exhaust gas purification device 50 is used as it is in the state in which it is not sufficiently renewed.

As is apparent from the above description and FIG. 1 to FIG. 18, since the exhaust gas purification system includes the traveling system operating means 29 which operates the traveling system of the working machine which is mounted with the engine 70, and the exhaust gas purification system is structured such that in the case that the renewal advance notifying means 24 is actuated in the warming aspect, the mode is changed to the emergency renewing mode which supplies the fuel into the exhaust gas purification device 50 by the post injection and maintains the engine rotating speed N at the predetermined value (the high idle rotating speed), by the thereafter allowing operation of the renewal admittance input means 21, and the operation of the traveling system operating means 29 in correspondence to the travel stop state of the working machine, it is possible to inhibit the change to the emergency renewing mode until the operator intentionally stops the traveling and the various works of the working machine. Therefore, it is possible to securely avoid the unexpected occurrence, for example, the rapid acceleration of the working machine, in the emergency renewing mode in which the engine rotating speed N is widely increased.

In this case, the traveling system operating means according to the embodiment is the parking brake operating means 29 which operates the working machine so as to maintain in the braked state, however, the traveling system operating means is not limited to this. For example, it may be constructed by main shift operating means such as a main shift lever which is provided in the working machine, auxiliary shift operating means such as an auxiliary shift switch, or forward and backward movement change operating means such as a reverser lever. In these cases, a neutral operation state of each of the operating means is an operation corresponding to a travel stop state of the working machine.

(9) Others

The present invention is not limited to the embodiments mentioned above, but can be embodied into various aspects. For example, the fuel injection device of the engine device is not limited to the common rail type, but may be constructed by an electronic governor type. In addition, the structure of each of the portions is not limited to the illustrated embodiment, but can be variously changed within a range which does not deflect from the scope of the present invention.

REFERENCE SIGNS LIST

FT Flag table
GPM General-purpose renewing program
11 ECU
21 Renewing switch (renewal admittance input means)
24 Renewal lamp (renewal advance notifying means and renewal informing means)
31 CPU
32 ROM (fixed memory means)
33 EEPROM (variable memory means)
50 DPF (exhaust gas purification device)
70 Engine
120 Common rail

The invention claimed is:

1. An exhaust gas purification system for a common rail type engine, the system comprising:
an exhaust gas purification device which is configured for use along an exhaust gas route of the common rail type engine;
an electronic control unit configured to provide renewing control of the exhaust gas purification device, the electronic control unit having a plurality of renewing modes for burning and removing a particulate matter deposited in the exhaust gas purification device;
a renewing lamp;
a renewing switch; and
a parking brake; and
wherein a first mode of said plurality of renewing modes is a manual auxiliary renewing mode indicated when the clogging state becomes greater than or equal to a prescribed level of the exhaust gas purification device and during which the electronic control unit is configured to control an intake air throttle device to restrict an amount of intake air so that an exhaust gas temperature is automatically increased;
wherein a second mode of said plurality of renewing modes is an initialization renewing mode, during which the electronic control unit is configured to provide control of a post injection to supply a fuel into the exhaust gas purification device regardless of a clogged state of the exhaust gas purification device, said initialization renewing mode being indicated when the electronic control unit determines that an accumulated drive time of the engine becomes equal to or more than a previously set time;
wherein a third mode of said plurality of renewing modes is a manual emergency renewing mode during which fuel is supplied to the exhaust gas purifying device by post injection, said electronic control unit configured to control renewing differently than for said manual auxiliary renewing mode by fixing engine speed at a maximum rotational engine speed and maintaining the engine idling at said maximum rotational engine speed for all renewing of the exhaust gas purification device during the manual emergency renewing mode;
wherein the renewing lamp is configured to prompt an operator to execute said manual auxiliary renewing mode, initialization mode, and manual emergency renewing mode;
wherein the renewing switch has an active state during which execution of said manual auxiliary renewing mode is permitted;
wherein the parking brake is for maintaining control of the working machine equipped with said engine;
wherein while the renewing lamp is on, the electronic control unit prevents operation of the manual auxiliary renewing mode when the renewing switch is in an inactive state; and
wherein when the renewing switch is in the inactive state for longer than a predetermined leaving time, the renewing lamp is triggered into a warning state that is different from a state that prompts the operator to execute said manual auxiliary renewing mode and the initialization renewing mode, after which the manual emergency renewing mode is invoked by the operator by the operation of the renewing switch to permit the manual emergency renewing mode and operation of the parking brake.

2. The exhaust gas purification system according to claim 1, wherein the renewing lamp is configured to receive power from a power supply, and wherein the electronic control unit is configured to set the renewing lamp to be on after restoration of power from the power supply following shut off of the power supply, provided that the renewing lamp was on when said power was shut off.

* * * * *